US009031859B2

(12) United States Patent
Salmon et al.

(10) Patent No.: US 9,031,859 B2
(45) Date of Patent: May 12, 2015

(54) REBATE AUTOMATION

(75) Inventors: Diane C. Salmon, Lafayette, CA (US);
James Alan VonDerheide, La Canada, CA (US); Edward W. Fordyce, III, Sedalia, CO (US); David Chauncey Shepard, Novato, CA (US); Gregory Michael Adams, Newmarket (NZ); Laura DiGioacchino, San Mateo, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 638 days.

(21) Appl. No.: 12/784,324

(22) Filed: May 20, 2010

(65) Prior Publication Data

US 2011/0066483 A1 Mar. 17, 2011

Related U.S. Application Data

(60) Provisional application No. 61/180,343, filed on May 21, 2009, provisional application No. 61/180,363, filed on May 21, 2009.

(51) Int. Cl.
*G06Q 30/00* (2012.01)
*G06Q 20/20* (2012.01)
*G06Q 20/04* (2012.01)
(Continued)

(52) U.S. Cl.
CPC ............... *G06Q 20/20* (2013.01); *G06Q 20/04* (2013.01); *G06Q 20/387* (2013.01); *G06Q 30/02* (2013.01); *G06Q 30/0215* (2013.01); *G06Q 30/0238* (2013.01)

(58) Field of Classification Search
CPC .................................................... G06Q 90/00

USPC ......................................................... 705/14.1
See application file for complete search history.

(56) References Cited

U.S. PATENT DOCUMENTS 4,941,090 A 7/1990 McCarthy
5,025,372 A 6/1991 Burton et al.
(Continued)

FOREIGN PATENT DOCUMENTS

CN 1584894 2/2005
JP 2003502763 1/2003
(Continued)

OTHER PUBLICATIONS

International Patent Application PCT/US10/35769, International Search Report and Written Opinion, Jan. 12, 2011.
(Continued)

*Primary Examiner* — Daniel Lastra
(74) *Attorney, Agent, or Firm* — Greenberg Traurig LLP

(57) ABSTRACT

A computer receives information that a request is made to authorize a transaction for a sale of a product by a merchant to an account holder in a transaction conducted on a consumer account issued to the account holder. When the computer confirms that the transaction is authorized and that the transaction occurs within a predetermined time period for which there is a rebate associated with the product and a corresponding sponsor financially responsible for the rebate, the computer communicates that the rebate is to be debited to an account of the sponsor and either: (i) given as a discount by the merchant at the point of sale to the account holder; or (ii) credited to an account issued to the account holder by the issuer.

25 Claims, 8 Drawing Sheets

(51) Int. Cl.
*G06Q 20/38* (2012.01)
*G06Q 30/02* (2012.01)

(56) References Cited

U.S. PATENT DOCUMENTS

| | | | |
|---|---|---|---|
| 5,117,355 A | 5/1992 | McCarthy | |
| 5,202,826 A | 4/1993 | McCarthy | |
| 5,287,268 A | 2/1994 | McCarthy | |
| 5,689,100 A | 11/1997 | Carrithers et al. | |
| 5,774,870 A | 6/1998 | Storey | |
| RE36,116 E | 2/1999 | McCarthy | |
| 5,923,016 A | 7/1999 | Fredregill et al. | |
| 5,937,391 A | 8/1999 | Ikeda et al. | |
| 5,956,694 A | 9/1999 | Powell | |
| 6,032,136 A | 2/2000 | Brake, Jr. et al. | |
| 6,138,911 A | 10/2000 | Fredregill et al. | |
| 6,243,687 B1 | 6/2001 | Powell | |
| 6,251,017 B1 | 6/2001 | Leason et al. | |
| 6,332,126 B1 | 12/2001 | Peirce et al. | |
| 6,334,108 B1 | 12/2001 | Deaton et al. | |
| 6,336,099 B1 | 1/2002 | Barnett et al. | |
| 6,341,353 B1 | 1/2002 | Herman et al. | |
| 6,408,286 B1 | 6/2002 | Heiden | |
| 6,450,407 B1 | 9/2002 | Freeman et al. | |
| 6,594,640 B1 | 7/2003 | Postrel | |
| 6,606,745 B2 | 8/2003 | Maggio | |
| 6,663,105 B1 | 12/2003 | Sullivan et al. | |
| 6,721,743 B1 | 4/2004 | Sakakibara | |
| 6,741,968 B2 | 5/2004 | Jacoves et al. | |
| 6,748,365 B1 * | 6/2004 | Quinlan et al. | 705/14.26 |
| 6,820,061 B2 | 11/2004 | Postrel | |
| 6,829,586 B2 | 12/2004 | Postrel | |
| 6,842,739 B2 | 1/2005 | Postrel | |
| 6,856,820 B1 | 2/2005 | Kolls | |
| 6,865,547 B1 | 3/2005 | Brake, Jr. et al. | |
| 6,910,003 B1 | 6/2005 | Arnold et al. | |
| 6,947,898 B2 | 9/2005 | Postrel | |
| 6,978,250 B1 | 12/2005 | Kawan et al. | |
| 7,054,830 B1 | 5/2006 | Eggleston et al. | |
| 7,072,864 B2 | 7/2006 | Brake, Jr. et al. | |
| 7,096,190 B2 | 8/2006 | Postrel | |
| 7,134,087 B2 | 11/2006 | Bushold et al. | |
| 7,163,145 B2 | 1/2007 | Cohagan et al. | |
| 7,263,507 B1 | 8/2007 | Brake, Jr. et al. | |
| 7,370,811 B2 | 5/2008 | Turner et al. | |
| 7,376,580 B1 | 5/2008 | Walker et al. | |
| 7,398,225 B2 | 7/2008 | Voltmer et al. | |
| 7,424,617 B2 | 9/2008 | Boyd et al. | |
| 7,428,498 B2 | 9/2008 | Voltmer et al. | |
| 7,606,730 B2 | 10/2009 | Antonucci | |
| 7,624,041 B2 | 11/2009 | Postrel | |
| 7,665,660 B2 | 2/2010 | Degliantoni et al. | |
| 7,680,688 B2 | 3/2010 | Hessburg et al. | |
| 7,686,218 B2 | 3/2010 | Hessburg et al. | |
| 7,742,943 B2 | 6/2010 | Postrel | |
| 7,753,264 B2 | 7/2010 | Shafer et al. | |
| 7,765,124 B2 | 7/2010 | Postrel | |
| 7,769,630 B2 | 8/2010 | Postrel | |
| 7,777,053 B2 | 8/2010 | Sanganbhatla et al. | |
| 7,828,206 B2 | 11/2010 | Hessburg et al. | |
| 7,853,529 B1 | 12/2010 | Walker et al. | |
| 7,868,218 B2 | 1/2011 | Clark et al. | |
| 7,870,022 B2 | 1/2011 | Bous et al. | |
| 7,894,634 B2 | 2/2011 | Chung | |
| 8,010,405 B1 | 8/2011 | Bortolin et al. | |
| 8,046,256 B2 | 10/2011 | Chien et al. | |
| 8,155,999 B2 | 4/2012 | de Boer et al. | |
| 8,180,671 B2 | 5/2012 | Cohagan et al. | |
| 8,265,993 B2 | 9/2012 | Chien et al. | |
| 8,285,643 B2 | 10/2012 | Isaacson et al. | |
| 8,301,593 B2 | 10/2012 | Hoffmann et al. | |
| 8,302,030 B2 | 10/2012 | Soroca et al. | |
| 8,313,023 B1 | 11/2012 | McGhie et al. | |
| 8,315,929 B2 | 11/2012 | Allen-Rouman et al. | |
| 8,332,290 B1 | 12/2012 | Venturo et al. | |
| 8,341,081 B1 | 12/2012 | Wang et al. | |
| 8,342,399 B1 | 1/2013 | McGhie et al. | |
| 8,401,967 B1 | 3/2013 | Postrel | |
| 8,463,706 B2 | 6/2013 | Cervenka et al. | |
| 8,478,640 B2 | 7/2013 | Postrel | |
| 8,511,550 B1 | 8/2013 | McGhie et al. | |
| 8,538,812 B2 | 9/2013 | Ramer et al. | |
| 8,612,208 B2 | 12/2013 | Cooper et al. | |
| 8,630,989 B2 | 1/2014 | Blohm et al. | |
| 8,725,568 B2 | 5/2014 | Cervenka et al. | |
| 2001/0034654 A1 | 10/2001 | L. Vigil et al. | |
| 2001/0054003 A1 | 12/2001 | Chien et al. | |
| 2002/0046116 A1 | 4/2002 | Hohle et al. | |
| 2002/0052860 A1 | 5/2002 | Geshwind | |
| 2002/0160761 A1 | 10/2002 | Wolfe | |
| 2003/0004808 A1 | 1/2003 | Elhaoussine et al. | |
| 2003/0040964 A1 | 2/2003 | Lacek | |
| 2003/0216967 A1 | 11/2003 | Williams | |
| 2003/0225618 A1 | 12/2003 | Hessburg et al. | |
| 2003/0236704 A1 | 12/2003 | Antonucci | |
| 2003/0236712 A1 | 12/2003 | Antonucci et al. | |
| 2004/0024739 A1 | 2/2004 | Copperman et al. | |
| 2004/0049423 A1 | 3/2004 | Kawashima et al. | |
| 2004/0083170 A1 | 4/2004 | Bam et al. | |
| 2004/0088376 A1 | 5/2004 | McCanne et al. | |
| 2004/0104760 A1 | 6/2004 | Ando | |
| 2004/0117250 A1 | 6/2004 | Lubow et al. | |
| 2004/0133472 A1 | 7/2004 | Leason et al. | |
| 2004/0138949 A1 | 7/2004 | Darnton et al. | |
| 2004/0186773 A1 | 9/2004 | George et al. | |
| 2004/0203648 A1 | 10/2004 | Wong | |
| 2004/0238622 A1 | 12/2004 | Freiberg | |
| 2004/0249710 A1 | 12/2004 | Smith et al. | |
| 2004/0260608 A1 | 12/2004 | Lewis et al. | |
| 2005/0010533 A1 * | 1/2005 | Cooper | 705/64 |
| 2005/0021399 A1 | 1/2005 | Postrel | |
| 2005/0021401 A1 | 1/2005 | Postrel | |
| 2005/0060225 A1 | 3/2005 | Postrel | |
| 2005/0080727 A1 | 4/2005 | Postrel | |
| 2005/0091152 A1 | 4/2005 | Suisa | |
| 2005/0096975 A1 | 5/2005 | Moshe | |
| 2005/0114213 A1 | 5/2005 | Smith et al. | |
| 2005/0119938 A1 | 6/2005 | Smith et al. | |
| 2005/0149394 A1 | 7/2005 | Postrel | |
| 2005/0205666 A1 | 9/2005 | Ward et al. | |
| 2005/0240472 A1 | 10/2005 | Postrel | |
| 2005/0240478 A1 | 10/2005 | Lubow et al. | |
| 2006/0010033 A1 | 1/2006 | Thomas | |
| 2006/0020511 A1 | 1/2006 | Postrel | |
| 2006/0053056 A1 | 3/2006 | Alspach-Goss et al. | |
| 2006/0059040 A1 | 3/2006 | Eldred et al. | |
| 2006/0129456 A1 | 6/2006 | Walker | |
| 2006/0184419 A1 | 8/2006 | Postrel | |
| 2006/0190337 A1 | 8/2006 | Ayers, Jr. | |
| 2006/0206376 A1 | 9/2006 | Gibbs et al. | |
| 2006/0208065 A1 | 9/2006 | Mendelovich et al. | |
| 2006/0253321 A1 | 11/2006 | Heywood | |
| 2006/0253392 A1 | 11/2006 | Davies | |
| 2006/0259364 A1 | 11/2006 | Strock et al. | |
| 2006/0287943 A1 | 12/2006 | Postrel | |
| 2007/0005416 A1 | 1/2007 | Jackson et al. | |
| 2007/0011044 A1 * | 1/2007 | Hansen | 705/14 |
| 2007/0038515 A1 | 2/2007 | Postrel | |
| 2007/0043613 A1 | 2/2007 | Longest | |
| 2007/0043619 A1 | 2/2007 | Leason et al. | |
| 2007/0043620 A1 | 2/2007 | Leason et al. | |
| 2007/0078719 A1 | 4/2007 | Schmitt et al. | |
| 2007/0100691 A1 | 5/2007 | Patterson | |
| 2007/0105536 A1 | 5/2007 | Tingo, Jr. | |
| 2007/0112629 A1 | 5/2007 | Solomon et al. | |
| 2007/0129955 A1 | 6/2007 | Dalmia et al. | |
| 2007/0129998 A1 | 6/2007 | Postrel | |
| 2007/0130011 A1 | 6/2007 | Postrel | |
| 2007/0143178 A1 | 6/2007 | Citrin et al. | |
| 2007/0168354 A1 | 7/2007 | Ramer et al. | |
| 2007/0192784 A1 | 8/2007 | Postrel | |
| 2007/0198338 A1 | 8/2007 | Heywood | |
| 2007/0214049 A1 | 9/2007 | Postrel | |
| 2007/0226059 A1 | 9/2007 | Postrel | |

(56) References Cited

U.S. PATENT DOCUMENTS

| | | |
|---|---|---|
| 2007/0260509 A1 | 11/2007 | Hines et al. |
| 2007/0288313 A1 | 12/2007 | Brodson et al. |
| 2008/0010154 A1 | 1/2008 | Tietzen et al. |
| 2008/0011837 A1 | 1/2008 | Wesley |
| 2008/0021784 A1 | 1/2008 | Hessburg et al. |
| 2008/0040222 A1 | 2/2008 | Gee |
| 2008/0040270 A1 | 2/2008 | Buchheit et al. |
| 2008/0059303 A1 | 3/2008 | Fordyce |
| 2008/0071640 A1 | 3/2008 | Nguyen |
| 2008/0077499 A1 | 3/2008 | Ariff et al. |
| 2008/0103968 A1 | 5/2008 | Bies et al. |
| 2008/0120221 A1 | 5/2008 | Toneguzzo |
| 2008/0133350 A1 | 6/2008 | White et al. |
| 2008/0133351 A1 | 6/2008 | White et al. |
| 2008/0147534 A1 | 6/2008 | Ephrati et al. |
| 2008/0154676 A1 | 6/2008 | Suk |
| 2008/0154722 A1 | 6/2008 | Galinos |
| 2008/0177627 A1 | 7/2008 | Cefail |
| 2008/0201224 A1 | 8/2008 | Owens et al. |
| 2008/0201226 A1 | 8/2008 | Carlson et al. |
| 2008/0221986 A1 | 9/2008 | Soicher et al. |
| 2008/0228563 A1 | 9/2008 | Zellner et al. |
| 2008/0228583 A1 | 9/2008 | MacDonald et al. |
| 2008/0249861 A1 | 10/2008 | Carotta et al. |
| 2008/0313034 A1 | 12/2008 | Wise |
| 2009/0006203 A1 | 1/2009 | Fordyce, III et al. |
| 2009/0018909 A1 | 1/2009 | Grecia |
| 2009/0030793 A1 | 1/2009 | Fordyce, III |
| 2009/0048916 A1 | 2/2009 | Nuzum et al. |
| 2009/0076911 A1 | 3/2009 | Vo et al. |
| 2009/0076912 A1 | 3/2009 | Rajan et al. |
| 2009/0106112 A1 | 4/2009 | Dalmia et al. |
| 2009/0106115 A1 | 4/2009 | James et al. |
| 2009/0106300 A1 | 4/2009 | Brown |
| 2009/0112721 A1 | 4/2009 | Hammad et al. |
| 2009/0176580 A1 | 7/2009 | Herrmann et al. |
| 2009/0198572 A1 | 8/2009 | Jurgens |
| 2009/0271262 A1 | 10/2009 | Hammad |
| 2009/0292595 A1 | 11/2009 | Tonnison et al. |
| 2009/0307118 A1 | 12/2009 | Baumgartner, IV |
| 2009/0307130 A1 | 12/2009 | Tan |
| 2010/0030688 A1 | 2/2010 | Patterson |
| 2010/0042517 A1 | 2/2010 | Paintin et al. |
| 2010/0051691 A1 | 3/2010 | Brooks et al. |
| 2010/0057551 A1 | 3/2010 | Blaisdell |
| 2010/0057553 A1 | 3/2010 | Ameiss et al. |
| 2010/0075638 A1 | 3/2010 | Carlson et al. |
| 2010/0076820 A1 | 3/2010 | Davis |
| 2010/0125737 A1 | 5/2010 | Kang |
| 2010/0145855 A1 | 6/2010 | Fordyce, III et al. |
| 2010/0174596 A1 | 7/2010 | Gilman et al. |
| 2010/0211445 A1 | 8/2010 | Bodington |
| 2010/0211469 A1 | 8/2010 | Salmon et al. |
| 2010/0274659 A1 | 10/2010 | Antonucci et al. |
| 2010/0306032 A1 | 12/2010 | Jolley |
| 2010/0312626 A1 | 12/2010 | Cervenka |
| 2010/0312631 A1 | 12/2010 | Cervenka |
| 2010/0312632 A1 | 12/2010 | Cervenka |
| 2010/0312633 A1 | 12/2010 | Cervenka |
| 2010/0312634 A1 | 12/2010 | Cervenka |
| 2010/0312635 A1 | 12/2010 | Cervenka |
| 2011/0022448 A1 | 1/2011 | Strock et al. |
| 2011/0022514 A1 | 1/2011 | Lal et al. |
| 2011/0047019 A1 | 2/2011 | Cervenka et al. |
| 2011/0082739 A1 | 4/2011 | Pourfallah |
| 2011/0087530 A1 | 4/2011 | Fordyce, III et al. |
| 2011/0087531 A1 | 4/2011 | Winters et al. |
| 2011/0145148 A1 | 6/2011 | Hammad |
| 2011/0161230 A1 | 6/2011 | Singh |
| 2011/0191417 A1 | 8/2011 | Rathod |
| 2011/0218868 A1 | 9/2011 | Young et al. |
| 2011/0231258 A1 | 9/2011 | Winters |
| 2011/0238483 A1 | 9/2011 | Yoo et al. |
| 2011/0276493 A1 | 11/2011 | Graham, III et al. |
| 2011/0276495 A1 | 11/2011 | Varadarajan et al. |
| 2011/0288918 A1 | 11/2011 | Cervenka et al. |
| 2011/0288924 A1 | 11/2011 | Thomas et al. |
| 2011/0295675 A1 | 12/2011 | Reodica |
| 2012/0010940 A1 | 1/2012 | Masi |
| 2012/0035998 A1 | 2/2012 | Chien et al. |
| 2012/0041812 A1 | 2/2012 | Postrel |
| 2012/0054000 A1 | 3/2012 | Boppert et al. |
| 2012/0101881 A1 | 4/2012 | Taylor et al. |
| 2012/0101894 A1 | 4/2012 | Sterling et al. |
| 2012/0123849 A1 | 5/2012 | Armstrong |
| 2012/0130705 A1 | 5/2012 | Sun et al. |
| 2012/0179531 A1 | 7/2012 | Kim |
| 2012/0191525 A1 | 7/2012 | Singh et al. |
| 2012/0215610 A1 | 8/2012 | Amaro et al. |
| 2012/0215624 A1 | 8/2012 | Ramer et al. |
| 2012/0215638 A1 | 8/2012 | Bennett et al. |
| 2012/0221446 A1 | 8/2012 | Grigg et al. |
| 2012/0226545 A1 | 9/2012 | Gebb et al. |
| 2012/0226604 A1 | 9/2012 | Isaacson et al. |
| 2012/0239477 A1 | 9/2012 | Cueli et al. |
| 2012/0245987 A1 | 9/2012 | Isaacson et al. |
| 2012/0267432 A1 | 10/2012 | Kuttuva |
| 2012/0271689 A1 | 10/2012 | Etheredge et al. |
| 2012/0271691 A1 | 10/2012 | Hammad et al. |
| 2012/0271697 A1 | 10/2012 | Gilman et al. |
| 2012/0290950 A1 | 11/2012 | Rapaport et al. |
| 2012/0303425 A1 | 11/2012 | Katzin et al. |
| 2012/0316945 A1 | 12/2012 | Wolf et al. |
| 2012/0323663 A1 | 12/2012 | Leach |
| 2013/0006848 A1 | 1/2013 | Kuttuva |
| 2013/0060679 A1 | 3/2013 | Oskolkov et al. |
| 2013/0091000 A1 | 4/2013 | Hagey et al. |
| 2013/0124278 A1 | 5/2013 | Najm |
| 2013/0124287 A1 | 5/2013 | Bjorn et al. |
| 2013/0132283 A1 | 5/2013 | Hayhow et al. |
| 2013/0151323 A1 | 6/2013 | Shepard et al. |
| 2013/0151401 A1 | 6/2013 | Scipioni et al. |
| 2013/0197991 A1 | 8/2013 | Basu et al. |
| 2013/0246150 A1 | 9/2013 | Ovick et al. |
| 2013/0246273 A1 | 9/2013 | Ovick et al. |
| 2013/0254004 A1 | 9/2013 | Cervenka et al. |
| 2013/0254008 A1 | 9/2013 | Ovick et al. |
| 2013/0268333 A1 | 10/2013 | Ovick et al. |
| 2013/0282586 A1 | 10/2013 | Ovick et al. |
| 2013/0325579 A1 | 12/2013 | Salmon et al. |
| 2013/0339167 A1 | 12/2013 | Taylor et al. |
| 2014/0040051 A1 | 2/2014 | Ovick et al. |
| 2014/0040135 A1 | 2/2014 | Ovick et al. |
| 2014/0046744 A1 | 2/2014 | Hagey |
| 2014/0129308 A1 | 5/2014 | Rappoport |
| 2014/0129314 A1 | 5/2014 | Kim |

FOREIGN PATENT DOCUMENTS

| | | |
|---|---|---|
| JP | 2004303015 | 10/2004 |
| KR | 20010083521 | 9/2001 |
| KR | 1020010083521 | 9/2001 |
| KR | 1020010096673 | 11/2001 |
| KR | 1020020050219 | 6/2002 |
| KR | 20030080111 | 10/2003 |
| KR | 1020040016771 | 2/2004 |
| KR | 20040028110 | 4/2004 |
| KR | 1020040040253 | 5/2004 |
| KR | 1020040077077 | 9/2004 |
| KR | 1020050061661 | 6/2005 |
| KR | 20060101241 | 9/2006 |
| KR | 100717590 | 5/2007 |
| KR | 1020070110241 | 11/2007 |
| KR | 100836484 | 6/2008 |
| KR | 20080102439 | 11/2008 |
| MX | PA1013136 | 6/2004 |
| WO | 0049551 | 8/2000 |
| WO | 0079461 | 12/2000 |
| WO | 2006121541 | 11/2006 |
| WO | 2008016923 | 2/2008 |
| WO | 2008102935 | 8/2008 |
| WO | 2009061019 | 5/2009 |

(56) References Cited

FOREIGN PATENT DOCUMENTS

| WO | 2010093893 | 8/2010 |
|---|---|---|
| WO | 2011028486 | 3/2011 |
| ZA | 200200475 | 6/2003 |

OTHER PUBLICATIONS

International Patent Application PCT/US2010/024057, International Search Report & Written Opinion, Sep. 28, 2010.

International Patent Application PCT/US2010/037646, International Search Report and Written Opinion, Jan. 18, 2011.

International Patent Application PCT/US2010/046360, International Seach Report and Written Opinion, Mar. 30, 2011.

International Patent Application PCT/US2012/059607, International Search Report and Written Opinion, Mar. 15, 2013.

International Patent Application PCT/US2012/068541, International Search Report and Written Opinion, Mar. 20, 2013.

International Patent Application PCT/US2013/023642 International Search Report and Written Opinion, May 30, 2013.

International Patent Application PCT/US2013/032307 International Search Report and Written Opinion, Jun. 26, 2013.

International Patent Application PCT/US12/59607, International Preliminary Report on Patentability, Apr. 15, 2014.

International Patent Application PCT/US12/68541, International Preliminary Report on Patentability, Jun. 10, 2014.

International Patent Application PCT/US13/23642, International Preliminary Report on Patentability, Aug. 5, 2014.

* cited by examiner

REBATE AUTOMATION

CROSS-REFERENCE TO RELATED APPLICATIONS

This application claims priority to, and the benefit of, U.S. Provisional Application Ser. No. 61/180,343, filed on May 21, 2009, titled "Rebate Automation," and U.S. Provisional Application Ser. No. 61/180,363, filed on May 21, 2009, titled "Rebate Automation," both of which are incorporated herein by reference.

FIELD

The present invention relates to a transaction with a merchant on an account held by an account holder, and more particularly relates to a rebate on the transaction.

BACKGROUND

A rebate program is a common tool for delivering added-value to consumers, and thus motivating incremental sales for a sponsor of the rebate program. The sponsor is usually a manufacturer. although other parties can individually or collectively sponsor the rebate program. Rebates typically require consumers to mail-in a purchase receipt and possibly other items, after which they receive a rebate check or gift card by mail. Manufacturers typically use third party service providers to handle in-bound mail receipts, verification, and production/delivery of rebate checks or gift cards.

Rebates are typically offered across all of the manufacturer's key distribution points such that a consumer can obtain the rebate from any particular merchant selling the manufacturer's products. Typical requirements of a standard rebate program usually involve a rebate offer pertaining to a specific product or service that can be uniquely identified such as by a Universal Product Code (UPC) or a stock-keeping unit (SKU). The manufacturer usually requires something physical to be returned by the consumer to track situations where the product purchased under a rebate program is returned after the rebate is sent to the consumer. For example, a consumer may be required to tear off and send back to the manufacturer a UPC, often appearing as a bar code, on packaging of a purchased product. The UPC will be required under the rebate program in order to have the requested rebate processed and paid.

The manufacturer's economic model assumes 'slippage', meaning that the process of collecting and mailing in the required items can discourage a consumer from responding to the rebate offer. The consumer, after shopping for a rebate eligible product or service, may forget, or lack the initiative, to collect all of the required rebate paperwork, fill out the required rebate forms, and properly address a mailing of the executed paper work to make a claim for the rebate. In fact, not all purchasers will go through with all of the steps that are required in order to get the rebate in a specified time frame. Also, consumers may submit incorrect or illegible data and nonconforming information. As a result of this lack of rebate program compliance by consumers, a substantial percentage of all rebates never get redeemed. As such, fewer rebates are paid by the rebate sponsors who, therefore, have an incentive to keep rebate redemption rates down by setting strict and rigorous rebate program rules. These rules may include limited filing periods, long processing time frames, rigorous requests for personal information, etc. As such, even substantially completed rebate forms might allow the corresponding rebate to be denied under rebate program's rules.

Another deterrent for consumers to participate in a rebate program is that there can be uncertainty around the rebate process. This uncertainty, in some cases, is because consumers have no way to find out if their submission of a rebate claim was received, if the claim had been verified for payment, or when the rebate will be paid.

For those consumers that actually do receive a rebate check or gift card in the mail, some paper rebate checks or gift cards are tossed in the trash by the consumer because they can be packaged in envelopes that look like 'junk mail'. The consumer behavior, often referred to as "breakage", occurs where a rebate is mailed but not redeemed or cashed by the mail recipient.

For the manufacturer or other sponsor of a rebate program, the cost of implementing a rebate program via physical processes (use of mail delivery services and paper rebate checks) is substantial on a per-rebate basis. The process makes it challenging to limit rebates to select distribution points (i.e., retailers) or to vary the rebate amount by the specific retailer. The cost of rebate program implementation also creates hurdles for partnerships between manufacturers and payment brands (e.g., Visa, Master Card, American Express, etc.) on rebate offers, since the necessary data is not easily obtained or easily used for processing rebates in the current prior art processes. On the other hand, retailers and manufacturers are in favor of rebates because they allow the consumer to focus, at the Point of Service terminal (POS), on paying the discounted, rebate price for a product or service, although the consumer is actually paying full price at the POS.

There is a need in the art to solve the forgoing rebate program problems.

SUMMARY OF THE INVENTION

In one implementation, a computer receives information that a request has been made to authorize a transaction for a sale of a product by a merchant to an account holder in a transaction conducted on a consumer account issued to the account holder. When the computer confirms that the transaction is authorized and that the transaction occurs within a predetermined time period for which there is a rebate associated with the product and a corresponding sponsor financially responsible for the rebate, the computer communicates that the rebate is to be debited to an account of the sponsor and is to be given as a discount by the merchant to the account holder at the point of sale.

In another implementation, a registrar receives applicants to register accounts for participation in a rebate program. The registrar is in communication with a transaction handler who, alone or via a third party administrator, administers the rebate program for applicable transactions on the registered accounts. A sponsor of the rebate program, who is in communication with the transaction handler, can be any number of individual or collective entities (an issuer of a registered account, a merchant retailing a rebate-eligible product, a manufacturer of a rebate-eligible product, a distributor of a rebate-eligible brand of products, etc.) For example, an issuer of an account to a consumer can be a bank that participates in a rebate program as a sponsor of the rebate program either on its own or with a particular manufacturer or merchant of a particular rebate-eligible product or brand of products. As an added value, because registration through a registrar can be required for rebate eligible accounts, an administrator of a rebate program (e.g., such as a payment processing entity like a transaction handler) has the ability to collect and mine account holder data that can be licensed for use to various rebate participating entities, such as shopping behavior of registered account holders.

For consumers, the process of registering one or more account numbers through a registrar, such as at a web portal for a web service, resolves some of the uncertainty issues experienced in the prior art rebate program processes. For instance, an account holder can be offered a convenient way to interactively participate in a rebate program with communications between the account holder and rebate participating entities that inform the account holder with rebate relevant information through a website accessible via web enabled stationary or mobile devices. In one implementation, an account holder can register one or more accounts online for which the account holder wants to receive a rebate for making a purchase on their account of one or more rebate-eligible products from one or more rebate-eligible merchants. The rebate-eligible product for which the account holder registers can be made by one or more manufacturers and be within one or more rebate-eligible brands that qualify for one or more rebate programs that are offered to the account holder by the issuer of the account. Any such rebate-eligible transaction on the account of the account holder will be processed by the transaction handler who is in communication with the registrar. The registration process can occur in response to a notice of a rebate program by an issuer, a merchant, a manufacturer or a transaction handler (or a combination thereof). Alternatively the consumer can register online after making one or more rebate-eligible purchases on their account. An account holder, in one implementation, can take advantage of a rebate offer for an purchase made in person or online, which rebate can be further upgraded or enhanced by the issuer-recognized level of the account upon which the transaction was conducted (i.e., gold card, silver card, platinum card, infinite card, etc.)

In yet another implementation, transaction data captured at the Point of Sale terminal (POS) in real-time can include product level data. The transaction handler, upon receipt of the transaction data, stores information about the account holder including demographic data. These data can then be shared with various sponsors of a rebate program to ascertain its successful and the relative merits of future rebate programs.

BRIEF DESCRIPTION OF THE DRAWINGS

Implementations of the invention will become more apparent from the detailed description set forth below when taken in conjunction with the drawings, in which like elements bear like reference numerals.

DETAILED DESCRIPTION

Figure 1:
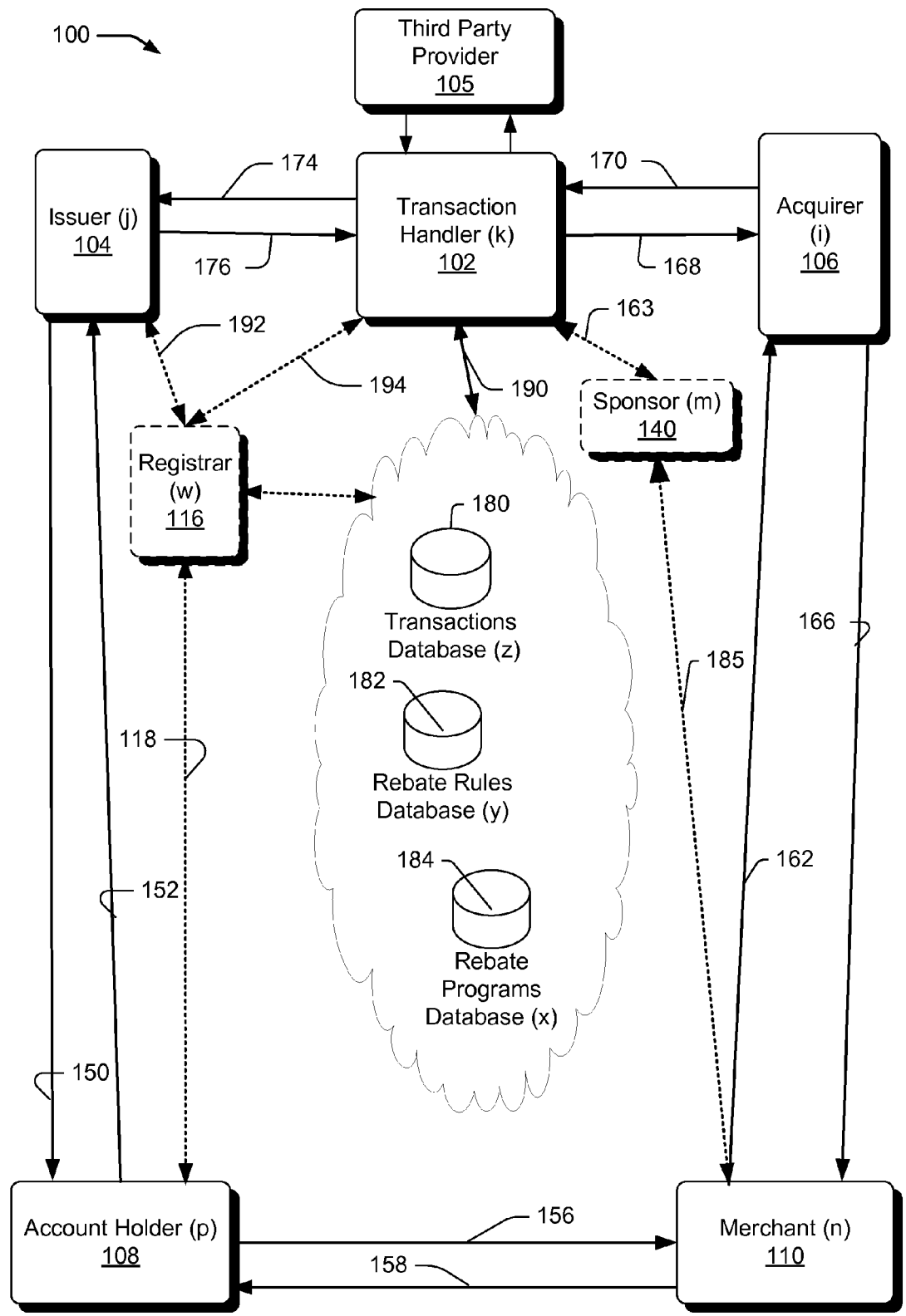
FIG. 1 illustrates a system level diagram depicting an exemplary rebate program among cooperating entities within a payment processing network.

A system for recognizing and administering a rebate, according to one implementation, is shown in FIG. 1. Rules are maintained in a Rebate Rules Database (y) 182 for each rebate program maintained in a Rebate Programs Database (x) 184. These rules are established for the use of Merchants 110 by one or more sponsors (m) 140 of each rebate program. Each Sponsor (m) 140 will charged for, and is expected to pay, all or a portion of the rebate amount according to the rules. By way of example, each Sponsor (w) 140 can be an Issuer (j) 104, a Merchant (n) 110, a manufacturer, a wholesaler, a corporate parent of any of the foregoing, etc. Each Sponsor (m) 140, who may have a communication capability 185 with each Merchant (m) 110, has an account recognized by a Transaction Handler (k) 102. The Transaction Handler (k) 102 will use the account of the Sponsor (m) 140 to make rebate settlements, either paying monies into the account for returned products for which rebates had already been paid, or for monies withdrawn for rebates to be paid and for which the Sponsor (m) 140 is responsible.

Issuer (j) 104 sends notification 150 to Account Holder (p) 108 of a new rebate registration program on a Registrar (w) 116 which may be, for instance, an interactive web service. After receipt of such notification 150, Account Holder (p) 108 sends a notification 152 to Issuer (j) 104 of its interest in participating in the new rebate registration program and registers 118 its account information with the Registrar (w) 116 for storage in Transactions Database (z) 180 for the particular rebate program in the Rebate Programs Database (x) 184 which complies with one or more program rules maintained by the Rebate Rules Database (y) 182. Registrar (w) 116 sends notices 192, 194 of Account Holder (p) 108's registration to Issuer (j) 104 and to Transaction Handler (k) 102, respectively. Transaction Handler (k) 102 may, in turn, send updates 163, 190 to each Sponsor (m) 140 and to (i) the Transactions Database (z) 180; (ii) the Rebate Rules Database (y) 182; and (iii) the Rebate Programs Database (x) 184.

In one implementation, Account Holder (p) 108 wishes to conduct a transaction on their account with a Merchant (n) 110 to purchase 158 a good or a service, for instance a particular brand and model of a laptop computer, which is eligible for a rebate. The laptop computer can be subject to a rebate offer to the Account Holder (p) 108 who can purchase the laptop on their account for $1400.00 with a rebate of $200, where the offer of the rebate is made by the manufacturer seen in FIG. 1 as Sponsor (m) 140. To conduct the transaction, the Account Holder (p) 108 presents to Merchant (n) 110 a payment device associated with the account of the account holder, like a credit card, debit card, gift card, or any other payment device that is linked to the account of the Account Holder (p) 108.

Merchant (n) 110 transmits 162 information about the laptop to Acquirer (i) 106. This information can be product level data, often referred to as Level III data, and can include a Stock Keeping Unit (SKU), a Universal Product Code (UPC), an identifier for the Manufacturer, a Model Number, a Serial Number, a Lot Number, an International Standard Book Number (ISBN), an identifier for a commodity into which the good or service being purchased may be classified, etc.

The Acquirer (i) 106 in turn transfers 170 data derived from the transaction to the Transaction Handler (k) 102 for authorization. The Transaction Handler (k) 102 will verify eligibility of the transaction for the rebate with components of each of (i) the Transactions Database (z) 180; (ii) the Rebate Rules Database (y) 182; and (iii) the Account Holder (p) 108's registered account(s) in the Rebate Programs Database (x) 184. Transaction Handler (k) 102 will transmit 174 data derived from the transaction to the Issuer (j) 104 that issued the account to the Account Holder (p) 108 to obtain authorization that Account Holder (p) 108 has authority to make purchases on the account and that the account has credit available and/or a remaining balance to make the purchase of the laptop and any other products or services in the transaction.

In one implementation, Issuer (j) 104 authorizes 176 the transaction with Transaction Handler (k) 102 and Transaction Handler (k) 102 transmits 168 an authorization of the purchase to Acquirer (i) 106, who in turn notifies 166 the Merchant (n) 110 of the authorization. Issuer (j) 104 reports 192 the status of the rebates received on Account Holder (p) 108's account to the Registrar (w) 116. In another implementation, Issuer (j) 104 will decline 176 the transaction with Transaction Handler (k) 102 and Transaction Handler (k) 102 will transmit 168 the lack of authorization of the purchase to Acquirer (i) 106, which in turn notifies 166 the Merchant (n) 110 as to the lack of authorization.

In one implementation, the account holder may be required to pay the full retail price of the rebate-eligible laptop 156 to the Merchant (n) 110 before receiving the rebate. Thereafter, however, the rebate amount for the laptop will be paid as a statement credit to the account of the Account Holder (p) 108. In this implementation, Sponsor (m) 140 will authorize 163 the rebate transaction with the Transaction Handler (k) 102. Transaction Handler (k) 102 will verify the rebate transaction with the Transactions database (z) 180, the Rebate Rules Database (y) 182 and the Rebate Programs Database (x) 184. After this verification, the Transaction Handler (k) 102 will transmit 163 verification information to Sponsor (m) 140. Sponsor (m) 140 will then authorize 163 Transaction Handler (k) 102 to transmit 174 a credit to the statement of account for the Account Holder (p) 108 via the Issuer (j) 104. The statement credit will be for the rebate amount for the laptop. Issuer (i) 194 may also notify 150 Account Holder (p) 108 of the credit to their statement for the account.

In another implementation, the Account Holder (p) 108 pays 156 the full price less the rebate amount for the laptop 156 to the Merchant (n) 110. For instance, when authorization is obtained, Merchant (n) 110 gives Account Holder (p) 108 the laptop 158 for a full price of $1400.00 less a $200.00 rebate in accordance with the rules as maintained in the Rebate Rules Database (y) 183. Thereafter, the Merchant (n) 110 will receive payment of the rebate amount from each responsible Sponsor (m) 140. Thus, the Merchant (n) 110 is repaid for the difference between the amount paid 158 by the Account Holder (p) 108 for the laptop and the actual price of the laptop. Here, when done in a batch mode after a number of transactions by account holders 108 for laptops purchased from a Merchant (n) 110, the Sponsor (m) 140 will reimburse the Merchant (n) 110 for the number of $200.00 rebate offers conducted over a particular period of time corresponding to the batch of the transactions. Sponsor (m) 140 will authorize 163 the rebate transactions with the Transaction Handler (k) 102. Transaction Handler (k) 102 will verify the rebate transactions with the Transactions database (z) 180, the Rebate Rules Database (y) 182, and with the Rebate Programs Database (x) 184. After this verification process, the Transaction Handler (k) 102 will transmit 163 verification information to Sponsor (m) 140. Sponsor (m) 140 will then authorize 163 Transaction Handler (k) 102 to transmit 168 a credit to Merchant (n) 110's Acquirer (i) 106 for the difference between the rebate purchase price and original price on a particular mutually agreed settlement period, e.g. monthly, quarterly or yearly. Acquirer (i) 106 will notify 166 Merchant (n) 110 of the credit to the statement for the account of the Merchant (n) 110.

If Account Holder (p) 108 wants to review the various purchases made over time that were eligible for rebates, Account Holder (p) 108 can check the status 118 of their rebates with the Registrar (w) 116.

After a rebate-eligible purchase has been made and the corresponding rebate given, the Account Holder (p) 108 can return the product. In such a case, there will be a rebate product settlement process that will be conducted. In one implementation, for any rebate-eligible product that had been returned by the Account Holder (p) 108, Sponsor (m) 140 can obtain a refund for any rebate payment that the Sponsor (m) 140 had previously given to either the Merchant (n) 110 or to the Account Holder (p) 108.

In one implementation, where Account Holder (p) 108 had paid the full price for the laptop and then received a $200.00 rebate as a statement credit, but thereafter the Account Holder (p) 108 returned the laptop to Merchant (n) 110, Merchant (n) 110 transmits 162 information about the returned product to Acquirer (i) 106, who in turn transmits 170 data about the returned product to the Transaction Handler (k) 102. Transaction Handler (k) 102 evaluates the return of the product in light of the original transaction and the rules for a corresponding rebate program as are maintained in (i) the Transactions Database (z) 180; (ii) the Rebate Rules Database (y) 182; and (iii) the Rebate Programs Database (x) 184. From this evaluation, Transaction Handler (k) 102 facilitates 174 a negative statement credit for the rebate amount to the account of the Account Holder (p) 108 via the Issuer (j) 104, and facilitates 163 a repayment of the rebate amount to the Sponsor (m) 140.

In another implementation, Account Holder (p) 108 paid $200 less than full price to the Merchant (n) 110 for the laptop. In this case, the Merchant (n) 110 has already been reimbursed for the $200 rebate from the Sponsor (m) 140. Thereafter, however, the Account Holder (p) 108 returns the laptop to Merchant (n) 110. The Merchant (n) 110 transmits 162 information about the returned product to Acquirer (i) 106, who in turn transmits 170 data about the returned product to the Transaction Handler (k) 102. Transaction Handler (k) 102 evaluates the return of the product in light of the original transaction and the rules for a corresponding rebate program as are maintained in (i) the Transactions Database (z) 180; (ii) the Rebate Rules Database (y) 182; and (iii) the Rebate Programs Database (x) 184. From this evaluation, Transaction Handler (k) 102 facilitates 168 a negative statement credit for the rebate amount to the account of the Merchant (n) 110 via the acquirer (i) 106, and facilitates 163 a repayment of the rebate amount to the Sponsor (m) 140.

In another implementation, a rebate program makes a requirement of the purchase of multiple different products for rebate eligibility. Here, the Account Holder (p) 108 has been issued an account that is then registered with Registrar (w) 116. The Account Holder (p) 180 is to receive an incentive of an offer of a rebate to conduct a transaction on the account with Merchant (n) 110 to purchase a specific set of branded products: an external monitor of Brand A, a printer of Brand B, and a laptop of Brand C. The data derived from the transaction will be stored in Transactions Database (z). According to rules maintained in a Rebate Rule Database (y) 182 for a Rebate Program maintained in Rebate Programs Database (x) 184, Merchant (n) 110 is authorized to offer a predetermined rebate of $350 for such a rebate-eligible transaction. A plurality of respective sponsors 140 will be responsible for sharing the cost of giving a statement credit to the account of the Account Holder (p) 180 who conducts the transaction, and/or for reimbursing the Merchant (n) 110 who sells the predetermined set of branded products at the rebated price. By way of example, the sponsor for the portion of the rebate pertaining to external monitor of Brand A might be the corporate head of Merchant (n) 110, the sponsor of the portion of the rebate pertaining to the printer of Brand B might be the domestic wholesaler of the printers, and the sponsor the portion of the rebate pertaining to the laptop of Brand C might be the manufacturer of Brand C.

In this implementation, the Account Holder (p) 108 presents 156 to Merchant (n) 110 a payment device like a Visa credit card, debit card, gift card, or any other payment device linked to the registered account of the Account Holder (p) 108 to purchase the predetermined set of branded products for which the rebate is eligible. Merchant (n) 110 sends 162 data derived from the purchase to Acquirer (i) 106 which in turn transfers 170 the data to the Transaction Handler (k) 102 for authorization. Transaction Handler (k) 102 verifies whether the rebate can be authorized via databases 180-184. The Transaction Handler (k) 102 will transmit 174 data from the transaction to the Issuer (j) 104 of the account of the Account holder (p) 108 to obtain authorization for the transaction. The authorization sought by the Transaction Handler (k) 102 from the Issuer (j) 104 is whether the Account Holder (p) 108 has authority to make purchases on the account of the payment device and that the account has credit available or a sufficient remaining balance to make the purchase of the predetermined set of branded goods. Such an authorization may take into consideration that the total upfront purchase price may be less than normal due to a Point-of-Sale rebate available for the predetermined set of branded goods.

The Issuer (j) 104 authorizes 176 the transaction with Transaction Handler (k) 102 and Transaction Handler (k) 102 transmits 168 authorization of the rebate-eligible transaction to Acquirer (i) 106, who in turn notifies 166 the Merchant (n) 110 of the successful authorization. Alternatively, Issuer (j) 104 will decline 176 the transaction with Transaction Handler (k) 102 and Transaction Handler (k) 102 transmits 168 the lack of authorization of the purchase to Acquirer (i) 106, who in turn notifies 166 the Merchant (n) 110.

Once authorization is obtained, Merchant (n) 110 gives 158 Account Holder (p) 108 the predetermined set of branded goods. Thereafter, the above described processes would apply, respectively, to the Transaction Handler (k) 102 facilitating the obtaining from the plurality of respective sponsors 140 the prorated cost of: (i) giving the statement credit to the account of the Account Holder (p) 180 who conducts the transaction, and (ii) reimbursing the Merchant (n) 110 who sells the set of branded products at the rebated price. Here, the prorated cost retrieved from each Sponsor (m) 140 would be a function of data in the databases 180, 182, and/or 184.

Of course, the rebate program might have allowed the Account Holder (p) 108 to purchase each of the different products from a plurality of different Merchants 110 in order to qualify for the single rebates, in which case the last Merchant (n) 110 may give the rebate at the POS, or the Transaction Handler (k) 102 may facilitate a statement credit to the account of the Account Holder (p) 108 after the full price was paid for each of the different products.

In yet another implementation, the Account Holder (p) 108 can return all or a part of the multiple different products for which a single rebate had been given. Should the Account Holder (p) 108 return one or more of the goods in the predetermined set of branded goods, as set forth above, the rebate given would be recovered from the Account Holder (p) 108 as a function of data in the databases 180, 182, and/or 184. The recovered rebate might also be predetermined to be returned prorata to the plurality of respective sponsors 140 as a function of data in the databases 180, 182, and/or 184.

In still another implementation, data can be mined from the above described rebate transaction collection process. In particular the Account holder (p) 108's demographic information can be used to deduce consumer behavioral patterns. To do so, information in the Transactions (z) 182, the accounts in the Rebate Programs (x) 184, and the Rebate Rules Database (y) 182 can be mined for reporting and analysis. These data and analysis can be provided by Transaction Handler (k) 102 to each Sponsor (m) 140 participating in a particular rebate program.

In FIG. 1, a plurality of Transaction Handlers 102 may be participating in a rebate program. For instance, such a plurality of Transaction Handlers 102 may include Visa, Master Card, American Express, Diners Club, Discover Card, Sears, Wal-Mart, Shopko, Target, etc. In such a case, one (1) third party rebate program administrator, seen in FIG. 1 at reference numeral 105, may be in communication with, and used by, each Transaction Handler (k) 102 to perform the above described rebate program processes.

Figure 2:
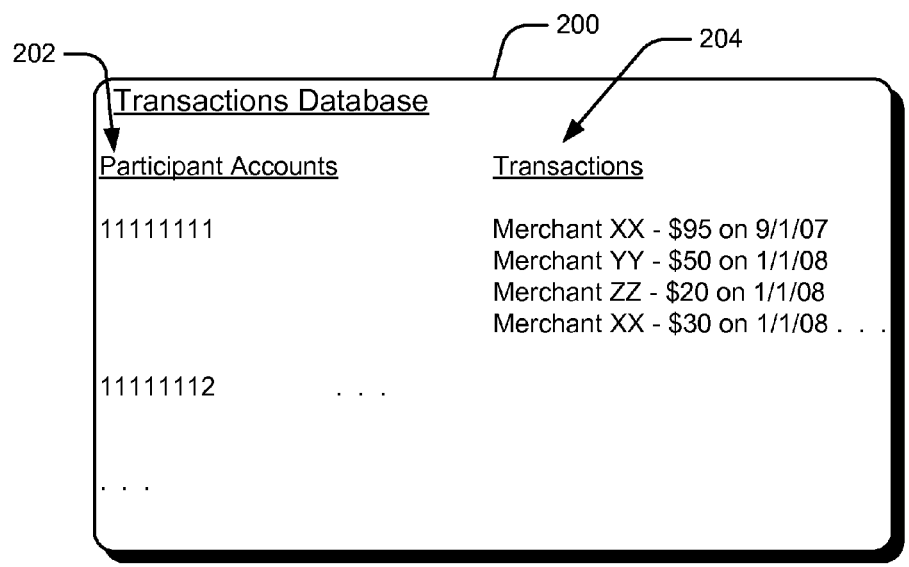
FIG. 2 illustrates a report generated from information included in a transactions database for transactions conducted on corresponding registered accounts with merchants, where each transaction was conducted on an account of an account holder for a rebate-eligible good or service.

An exemplary report 200 is seen in FIG. 2 which reports a plurality accounts 202 as being registered by Registrar (w) 116 to participate in a rebate program as stored in Rebate Rules Database (y) 182 and Rebate Programs Database (x) 184. A plurality of transactions 204 on report 200, corresponding to a respective one of the plurality of accounts 202, are shown as having been rebate-eligible. Data pertaining to each such transaction 202 can be derived from Transactions Database (z) 180.

Figure 3:
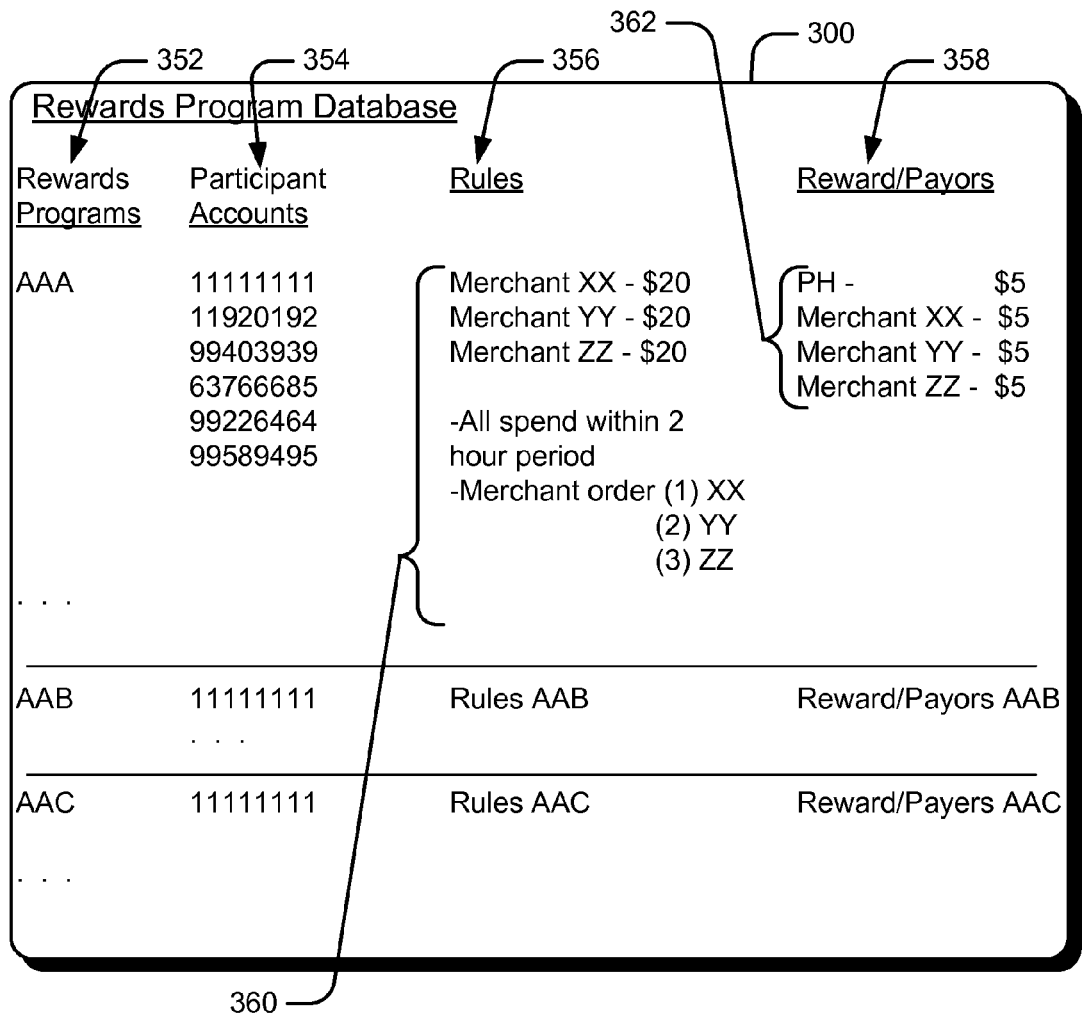
FIG. 3 illustrates a report generated from information included in a rewards program database, where the report includes transaction information about each of several rebate programs.

An exemplary report 300 is seen in FIG. 3 which reports on information in Rebate Programs Database (x) 184. A plurality of Reward Programs 352 are shown as well as the accounts 354 that are registered with each program. Rules 356, drawn from Rebate Rules Database (y) 182, shows those merchants 360 that are participating in the program and the respective rebate amount each is allowed to offer, as well as other terms of the program. Sponsors 362, listed on report 300 at the column 358 labeled "Reward/Payors" are listed for each Rewards Program 352.

Figure 4:
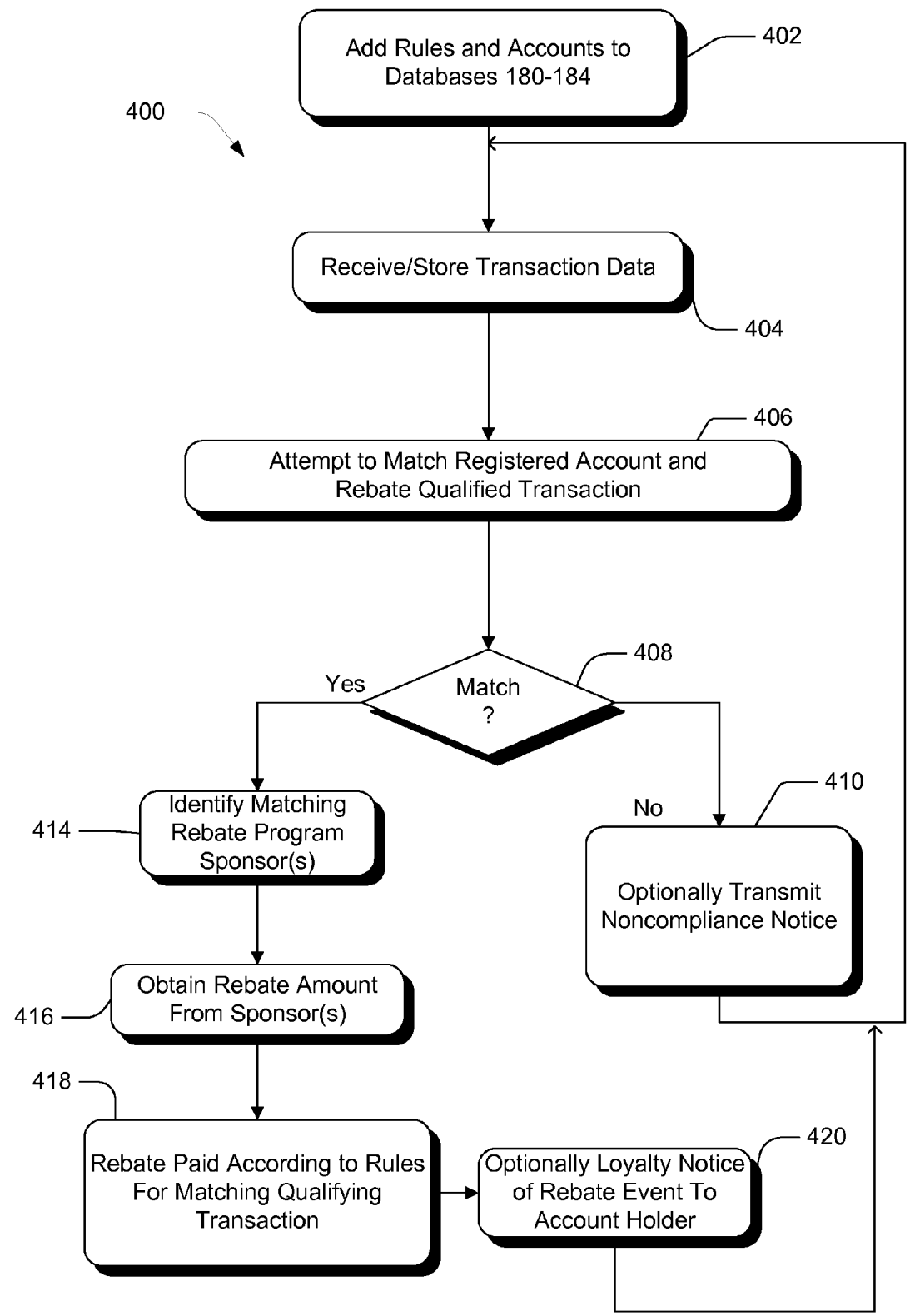
FIG. 4 is a flow diagram illustrating an exemplary rebate redemption process.

FIG. 4 is a flow diagram illustrating an exemplary rebate redemption process 400 in which, at step 402, rules are added to Rebate Rules Database (y) 182 for a rebate program stored in Rebate Programs Database (x) 184, and accounts are registered by Account Holders (p) 108 with Registrar (w) 116. At step 404, a Transaction Handler (k) 102 (or third party agent provider 105 thereof), receives a transaction for storing in Transactions Database (z) 180. At step 406, an attempt is made by Transaction Handler (k) 102 to match the account of the transaction with registered accounts maintained by Registrar (w) 116. If the account is matched, then the received transaction is analyzed against databases 182-184 for matching eligibility and compliance with one or more rebate programs. If there is no match, as determined at step 408, then an optional notice of noncompliance can be transmitted at step 410. If there is the required matches for both eligibility and compliance, then step 414 allows the Transaction Handler (k) 102 to identify the matching rebate program Sponsor(s) (m) 140. When so identified, the Transaction Handler (k) 102 obtains from the respective accounts of the matching rebate program Sponsor(s) (m) 140 the rebate amount for the qualifying transaction, as shown at step 416. The rebate amount so obtained can then be paid as a statement credit, at step 418, into the account of the registered Account Holder (p) 108 who conducted the qualifying transaction on their account. Alternatively, the rebate amount so obtained can be offered as a discount at the POS by the merchant who will then be repaid, at step 418, as a credit to the merchant's account with their corresponding acquirer in the form of a statement credit. Optionally, the registered Account Holder (p) 108 can be messaged at step 420 to confirm that they had won a rebate, thereby inducing loyalty to both the rebate sponsor. Loyalty may also be induced to other parties that are noticeably associated with the rebate (e.g., the Issuer (j) 104, the Merchant (n) 110 with whom the rebate-eligible transaction was conducted, the Transaction Hander (k) 102 (Visa, Master Card, American Express, Diners Club, Discover Card, Sears, Wal-Mart, Shopko, Target, etc.)) who facilitated and perhaps also advertised the relationship between the parties depicted in FIG. 1 and through whom the rebate was credited to the registered account.

Following the processing of each rebate-eligible transaction at step 420, the next transaction can be similarly processed by the Transaction Hander (k) 102. As demonstrated, the Transaction Hander (k) 102 can build loyalty by providing an alternative to paper rebate checks and other rebate requirements by offering to the registered Account Holders 108 the above described process that is comparably simplified for the account holder, thereby differentiating cooperating merchants, manufacturers, and brands from those that do not participate in the simplified process, thereby increase sales.

In yet another implementation, a payment processing network has a plurality of transaction handlers each of which is in communication, for the processing of payments on respective transactions, with a respective plurality of acquirers and a respective plurality of issuers. In this network, each transaction handler processes transactions on a set of accounts that is different from the set of accounts processed by any other transaction handler. For instance, one such transaction action handler can be Visa, another American Express, another Discover Card, another, Diners Club, another Master Card, etc. In this implementation, a Third Party Rebate Program Administrator (TPTPA) is in communication with each of the transaction handlers. In this network, the TPTPA receives information from one of the transaction handlers that there has been a sale of a product by a merchant to an account holder in a transaction conducted on a consumer account issued to the account holder. For this transaction, the consumer account was issued to the account holder by an issuer. The merchant communicates the transaction to an acquirer who communicates the transaction to the transaction handler who requests payment for the transaction from the issuer and who pays the acquirer for the merchant with a payment for the transaction from the issuer. The acquirer then pays the payment for the transaction to the merchant. According to predetermined rules for a rebate program, the TPTPA confirms that the transaction has occurred within a predetermined time period and that there is a rebate associated with the product and a corresponding sponsor that is financially responsible for the rebate.

Upon such confirmation, the TPTPA forms a transmission containing information for delivery to the corresponding transaction handler giving instructions to: (i) debit the rebate to a sponsor account of the sponsor; and (ii) inform the merchant, through the corresponding acquirer, to discount the sale of the product to the account holder by the amount of the rebate, or alternatively, to credit the rebate to the consumer account issued to the account holder by the corresponding issuer. Note that, in some implementations, a rebate can be received by a consumer regardless of which participating account the consumer had used to conduct the transaction.

Exemplary Transaction Processing System

Figure 5:
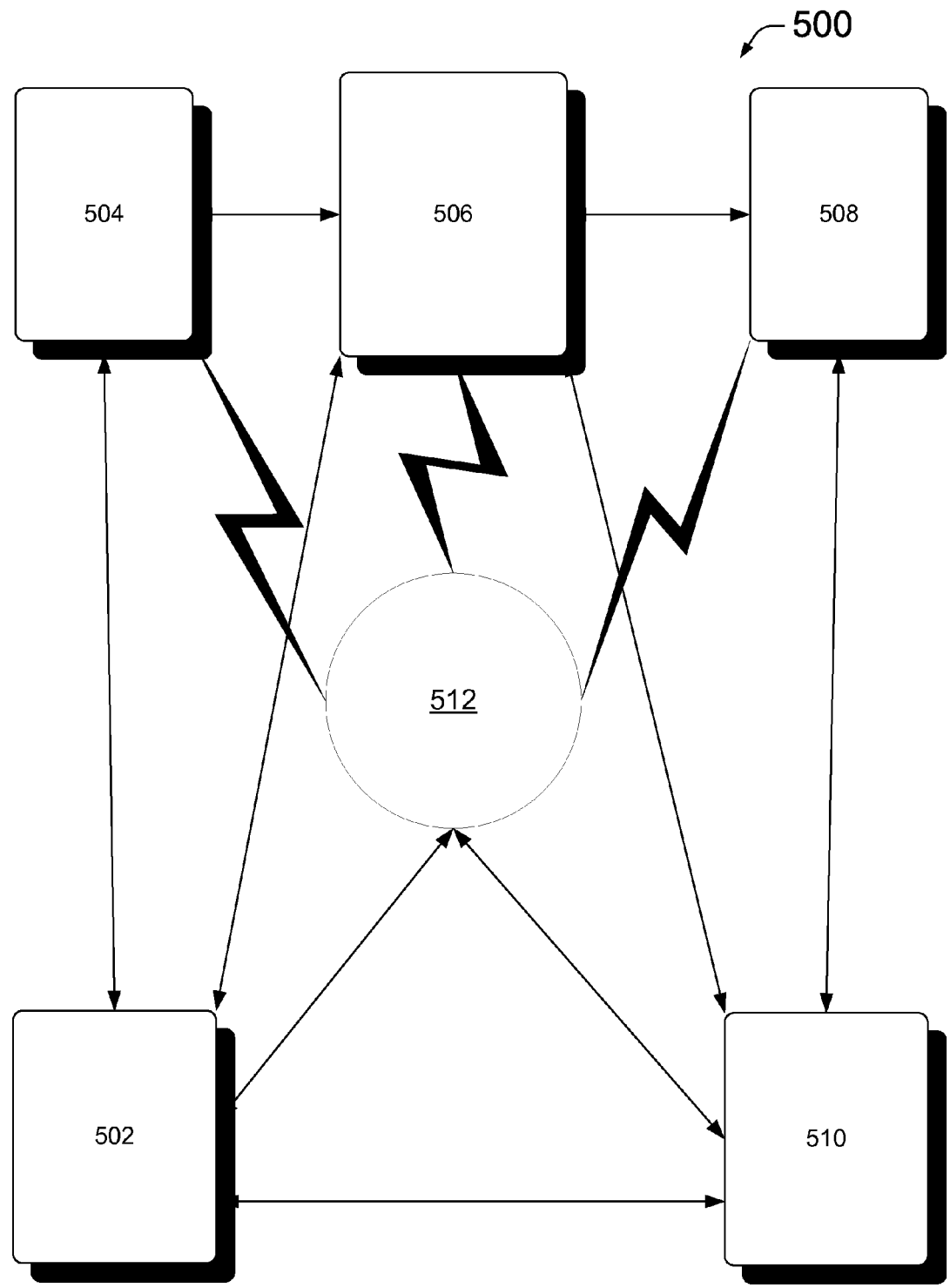
FIG. 5 depicts a system level diagram of an exemplary payment processing network illustrating an environment in which the rebate programs disclosed herein may be implemented.

As background information for the foregoing description, as will be readily understood by persons of ordinary skill in payment systems, the transaction in the payment system can include participation from different entities that are each a component of the payment processing system. An exemplary payment processing system is depicted in FIG. 5 as the payment processing system 500. The payment processing system 500 includes an issuer 504, a transaction handler 506, an acquirer 508, a merchant 510, and a consumer 502. The acquirer 508 and the issuer 504 can communicate through the transaction handler 506. The merchant 510 may utilize at least one POS that can communicate with the acquirer 508, the transaction handler 506, or the issuer 504. Thus, the POS is in operative communication with the payment processing system 500.

Typically, the transaction begins with the consumer 502 presenting a corresponding account number of the account, such as through the use of a computer terminal or a portable consumer device 512, to the merchant 510 to initiate an exchange for a good or service. The consumer 502 may be an individual or a corporate entity. The consumer 502 may be an account holder of the account issued by the issuer 504 such as a joint account holder of the account or a person having access to the account such as an employee of a corporate entity having access to a corporate account. The portable consumer device 512 may include a payment card, a gift card, a smartcard, a smart media, a payroll card, a health care card, a wrist band, a machine readable medium containing account information, a keychain device such as the SPEEDPASS® commercially available from ExxonMobil Corporation or a supermarket discount card, a cellular phone, personal digital assistant, a pager, a security card, a computer, an access card, a wireless terminal, or a transponder, for example. The portable consumer device may include a volatile or a non-volatile memory to store information such as the account number or a name of the account holder.

The merchant 510 may use an acceptance point device, such as the POS to obtain account information, such as the indicator for the account (e.g., the account number of the account), from the portable consumer device. The portable consumer device may interface with the POS using a mechanism including any suitable electrical, magnetic, or optical interfacing system such as a contactless system using radio frequency, a magnetic field recognition system, or a contact system such as a magnetic stripe reader. The POS sends a transaction authorization request to the issuer 504 of the portable consumer device. Alternatively, or in combination, the portable consumer device may communicate with the issuer 504, the transaction handler 506, or the acquirer 508.

The issuer 504 may submit an authorization response for the transaction via the transaction handler 506. Authorization response includes the issuer 504, or the transaction handler 506 on behalf of the issuer 504, authorizing the transaction in connection with instructions of the issuer 504, such as through the use of business rules. The transaction handler 506 may maintain a log or history of authorized transactions.

Once authorized, the merchant 510 can record the authorization and allow the consumer 502 to receive the good or service.

The merchant 510 may, at discrete periods, such as the end of the day, submit a list of authorized transactions to the acquirer 508, or other components of the payment processing system 500, for clearing and settling. The transaction handler 506 may compare the submitted authorized transaction list with its own log of authorized transactions. If a match is found, the transaction handler 506 may route the clearing and settling request from the corresponding acquirer 508 to the corresponding issuer 504 involved in each transaction. Once the acquirer 508 receives the payment of the transaction from the issuer 504, it can forward the payment to the merchant 510 less any transaction costs, such as fees.

There may be intermittent steps in the foregoing process, some of which may occur simultaneously. For example, the acquirer 508 can initiate the clearing and settling process, which can result in payment to the acquirer 508 for the amount of the transaction. Alternatively, or in combination, the acquirer 508 may request from the transaction handler 506 that the transaction be cleared and settled.

Another Exemplary Transaction Processing System

Figure 6:
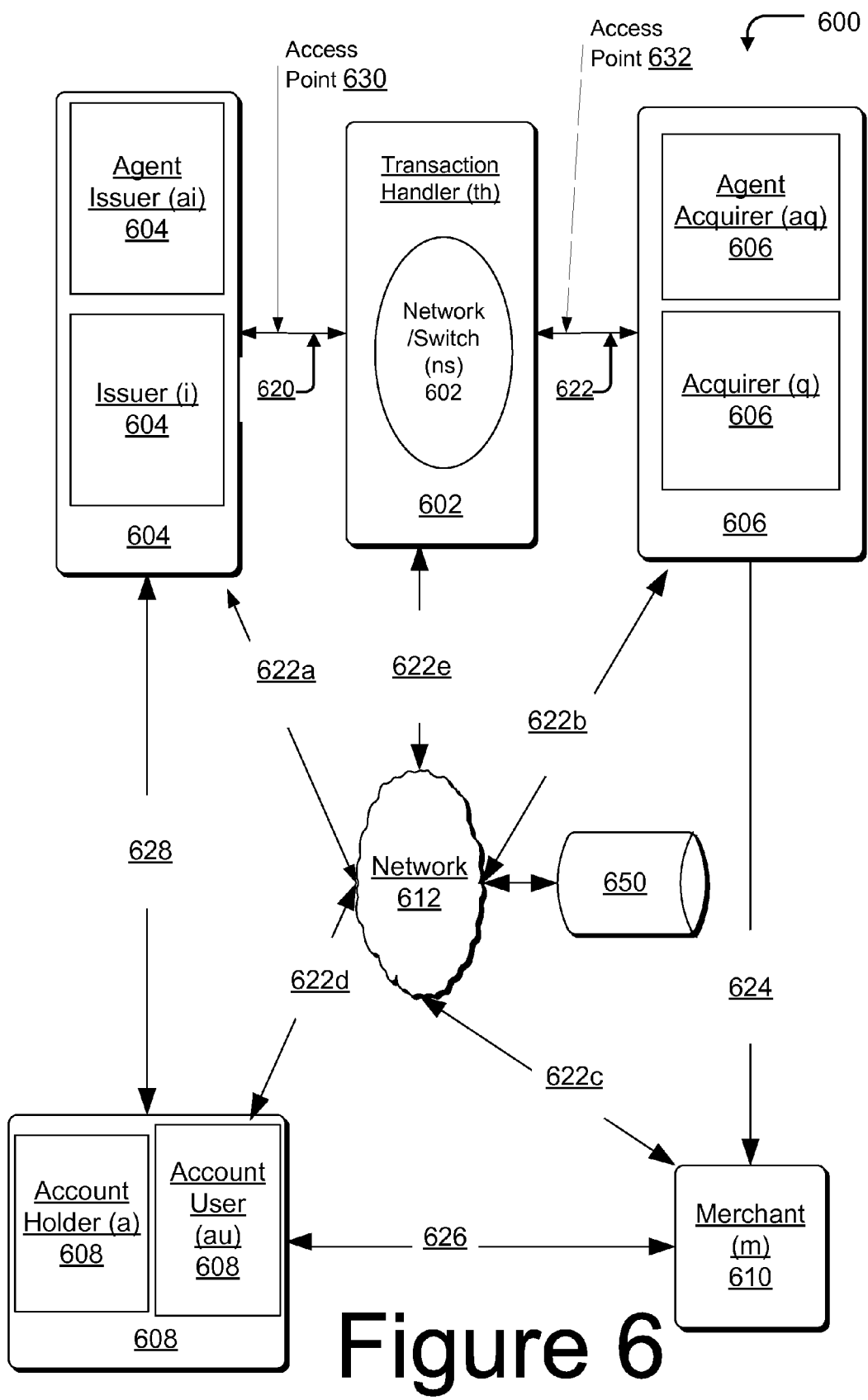
FIG. 6, depicts a system level diagram of an exemplary transaction processing system as an environment in which the rebate programs disclosed herein may be implemented.

As still further background information for the foregoing description, as will be readily understood by persons of ordinary skill in payment systems, now referring to FIG. 6, a transaction processing system 600 is seen. The general environment of FIG. 6 has various components that include a merchant (m) 610, such as the merchant, who can conduct a transaction for goods and/or services with an account user (au) (e.g., consumer) on an account issued to an account holder (a) 608 by an issuer (i) 604, where the processes of paying and being paid for the transaction are coordinated by at least one transaction handler (th) 602 (e.g., the transaction handler) (the components being collectively referred to as "users"). The transaction includes participation from different entities that are each a component of the transaction processing system 600.

The transaction processing system 600 may have at least one of a plurality of transaction handlers (th) 602 that includes transaction handler (1) 602 through transaction handler (TH) 602, where TH can be up to and greater than an eight digit integer.

The transaction processing system 600 has a plurality of merchants (m) 610 that includes merchant (1) 610 through merchant (M) 610, where M can be up to and greater than an eight digit integer. Merchant (m) 610 may be a person or entity that sells goods and/or services. Merchant (m) 610 may also be, for instance, a manufacturer, a distributor, a retailer, a load agent, a drugstore, a grocery store, a gas station, a hardware store, a supermarket, a boutique, a restaurant, or a doctor's office. In a business-to-business setting, the account holder (a) 608 may be a second merchant (m) 610 making a purchase from another merchant (m) 610.

Transaction processing system 600 includes account user (1) 608 through account user (AU) 608, where AU can be as large as a ten digit integer or larger. Each account user (au) conducts a transaction with merchant (m) 610 for goods and/or services using the account that has been issued by an issuer (i) 604 to a corresponding account holder (a) 608. Data from the transaction on the account is collected by the merchant (m) 610 and forwarded to a corresponding acquirer (a) 606. Acquirer (a) 606 forwards the data to transaction handler (th) 602 who facilitates payment for the transaction from the account issued by the issuer (i) 604 to account holder (a) 608.

Transaction processing system 600 has a plurality of acquirers (q) 606. Each acquirer (q) 606 may be assisted in processing one or more transactions by a corresponding agent acquirer (aq) 606, where 'q' can be an integer from 1 to Q, where aq can be an integer from 1 to AQ, and where Q and AQ can be as large as a eight digit integer or larger. Each acquirer (q) 606 may be assisted in processing one or more transactions by a corresponding agent acquirer (aq) 606, where 'q' can be an integer from 1 to Q, where aq can be an integer from 1 to AQ, and where Q and AQ can be as large as a eight digit integer or larger.

The transaction handler (th) 602 may process a plurality of transactions within the transaction processing system 600. The transaction handler (th) 602 can include one or a plurality of networks and switches (ns) 602. Each network/switch (ns) 602 can be a mainframe computer in a geographic location different than each other network/switch (ns) 602, where 'ns' is an integer from one to NS, and where NS can be as large as a four digit integer or larger.

Dedicated communication systems 620, 622 (e.g., private communication network(s)) facilitate communication between the transaction handler (th) 602 and each issuer (i) 604 and each acquirer (a) 606. A Network 612, via e-mail, the World Wide Web, cellular telephony, and/or other optionally public and private communications systems, can facilitate communications 622a-622e among and between each issuer (i) 604, each acquirer (a) 606, each merchant (m) 610, each account holder (a) 608, and the transaction handler (th) 602. Alternatively and optionally, one or more dedicated communication systems 624, 626, and 628 can facilitate respective communications between each acquirer (a) 606 and each merchant (m) 610, each merchant (m) and each account holder (a) 608, and each account holder (a) 608 and each issuer (i) 604, respectively.

The Network 612 may represent any of a variety of suitable means for exchanging data, such as: an Internet, an intranet, an extranet, a wide area network (WAN), a local area network (LAN), a virtual private network, a satellite communications network, an Automatic Teller Machine (ATM) network, an interactive television network, or any combination of the forgoing. Network 612 may contain either or both wired and wireless connections for the transmission of signals including electrical, magnetic, and a combination thereof. Examples of such connections are known in the art and include: radio frequency connections, optical connections, etc. To illustrate, the connection for the transmission of signals may be a telephone link, a Digital Subscriber Line, or cable link. Moreover, network 612 may utilize any of a variety of communication protocols, such as Transmission Control Protocol/Internet Protocol (TCP/IP), for example. There may be multiple nodes within the network 612, each of which may conduct some level of processing on the data transmitted within the transaction processing system 600.

Users of the transaction processing system 600 may interact with one another or receive data about one another within the transaction processing system 600 using any of a variety of communication devices. The communication device may have a processing unit operatively connected to a display and memory such as Random Access Memory ("RAM") and/or Read-Only Memory ("ROM"). The communication device may be combination of hardware and software that enables an input device such as a keyboard, a mouse, a stylus and touch screen, or the like.

For example, use of the transaction processing system 600 by the account holder (a) 608 may include the use of a portable consumer device (PCD). The PCD may be one of the communication devices, or may be used in conjunction with, or as part of, the communication device. The PCD may be in a form factor that can be: a card (e.g., bank card, payment card, financial card, credit card, charge card, debit card, gift card, transit pass, smart card, access card, a payroll card, security card, healthcare card, or telephone card), a tag, a wristwatch, wrist band, a fob (e.g., SPEEDPASS® commercially available from ExxonMobil Corporation), a machine readable medium containing account information, a pager, a cellular telephone, a personal digital assistant, a digital audio player, a computer (e.g., laptop computer), a set-top box, a portable workstation, a minicomputer, or a combination thereof. The PCD may have near field or far field communication capabilities (e.g., satellite communication or communication to cell sites of a cellular network) for telephony or data transfer such as communication with a global positioning system (GPS). The PCD may support a number of services such as SMS for text messaging and Multimedia Messaging Service (MMS) for transfer of photographs and videos, electronic mail (email) access.

The PCD may include a computer readable medium. The computer readable medium, such as a magnetic stripe or a memory of a chip or a chipset, may include a volatile, a non-volatile, a read only, or a programmable memory that stores data, such as an account identifier, a consumer identifier, and/or an expiration date. The computer readable medium may including executable instructions that, when executed by a computer, the computer will perform a method. For example, the computer readable memory may include information such as the account number or an account holder (a) 608's name.

Examples of the PCD with memory and executable instructions include: a smart card, a personal digital assistant, a digital audio player, a cellular telephone, a personal computer, or a combination thereof. To illustrate, the PCD may be a financial card that can be used by a consumer to conduct a contactless transaction with a merchant, where the financial card includes a microprocessor, a programmable memory, and a transponder (e.g., transmitter or receiver). The financial card can have near field communication capabilities, such as by one or more radio frequency communications such as are used in a "Blue Tooth" communication wireless protocol for exchanging data over short distances from fixed and mobile devices, thereby creating personal area networks.

Merchant (m) 610 may utilize at least one POI terminal (e.g., Point of Service or browser enabled consumer cellular telephone); that can communicate with the account user (au) 608, the acquirer (a) 606, the transaction handler (th) 602, or the issuer (i) 604. A Point of Interaction (POI) can be a physical or virtual communication vehicle that provides the opportunity, through any channel to engage with the consumer for the purposes of providing content, messaging or other communication, related directly or indirectly to the facilitation or execution of a transaction between the merchant (m) 610 and the consumer. Examples of the POI include: a physical or virtual Point of Service (POS) terminal, the PCD of the consumer, a portable digital assistant, a cellular telephone, paper mail, e-mail, an Internet website rendered via a browser executing on computing device, or a combination of the forgoing. Thus, the POI terminal is in operative communication with the transaction processing system 600.

The PCD may interface with the POI using a mechanism including any suitable electrical, magnetic, or optical interfacing system such as a contactless system using radio frequency, a magnetic field recognition system, or a contact system such as a magnetic stripe reader. To illustrate, the POI may have a magnetic stripe reader that makes contact with the magnetic stripe of a healthcare card (e.g., Flexible Savings Account card) of the consumer. As such, data encoded in the magnetic stripe on the healthcare card of consumer read and passed to the POI at merchant (m) 610. These data can include an account identifier of a healthcare account. In another example, the POI may be the PCD of the consumer, such as the cellular telephone of the consumer, where the merchant (m) 610, or an agent thereof, receives the account identifier of the consumer via a webpage of an interactive website rendered by a browser executing on a World Wide Web (Web) enabled PCD.

Typically, a transaction begins with account user (au) 608 presenting the portable consumer device to the merchant (m) 610 to initiate an exchange for resources (e.g., a good or service). The portable consumer device may be associated with an account (e.g., a credit account) of account holder (a) 608 that was issued to the account holder (a) 608 by issuer (i) 604.

Merchant (m) 610 may use the POI terminal to obtain account information, such as a number of the account of the account holder (a) 608, from the portable consumer device. The portable consumer device may interface with the POI terminal using a mechanism including any suitable electrical, magnetic, or optical interfacing system such as a contactless system using radio frequency or magnetic field recognition system or contact system such as a magnetic stripe reader. The POI terminal sends a transaction authorization request to the issuer (i) 604 of the account associated with the PCD. Alternatively, or in combination, the PCD may communicate with issuer (i) 604, transaction handler (th) 602, or acquirer (a) 606.

Issuer (i) 604 may authorize the transaction and forward same to the transaction handler (th) 602. Transaction handler (th) 602 may also clear the transaction. Authorization includes issuer (i) 604, or transaction handler (th) 602 on behalf of issuer (i) 604, authorizing the transaction in connection with issuer (i) 604's instructions such as through the use of business rules. The business rules could include instructions or guidelines from the transaction handler (th) 602, the account holder (a) 608, the merchant (m) 610, the acquirer (a) 606, the issuer (i) 604, a related financial institution, or combinations thereof. The transaction handler (th) 602 may, but need not, maintain a log or history of authorized transactions. Once approved, the merchant (m) 610 may record the authorization, allowing the account user (au) 608 to receive the good or service from merchant (m) or an agent thereof.

The merchant (m) 610 may, at discrete periods, such as the end of the day, submit a list of authorized transactions to the acquirer (a) 606 or other transaction related data for processing through the transaction processing system 600. The transaction handler (th) 602 may optionally compare the submitted authorized transaction list with its own log of authorized transactions. The transaction handler (th) 602 may route authorization transaction amount requests from the corresponding the acquirer (a) 606 to the corresponding issuer (i) 604 involved in each transaction. Once the acquirer (a) 606 receives the payment of the authorized transaction from the issuer (i) 604, the acquirer (a) 606 can forward the payment to the merchant (m) 610 less any transaction costs, such as fees for the processing of the transaction. If the transaction involves a debit or pre-paid card, the acquirer (a) 606 may choose not to wait for the issuer (i) 604 to forward the payment prior to paying merchant (m) 610.

There may be intermittent steps in the foregoing process, some of which may occur simultaneously. For example, the acquirer (a) 606 can initiate the clearing and settling process, which can result in payment to the acquirer (a) 606 for the amount of the transaction. The acquirer (a) 606 may request from the transaction handler (th) 602 that the transaction be cleared and settled. Clearing includes the exchange of financial information between the issuer (i) 604 and the acquirer (a) 606 and settlement includes the exchange of funds. The transaction handler (th) 602 can provide services in connection with settlement of the transaction. The settlement of a transaction includes depositing an amount of the transaction settlement from a settlement house, such as a settlement bank, which transaction handler (th) 602 typically chooses, into a clearinghouse bank, such as a clearing bank, that acquirer (a) 606 typically chooses. The issuer (i) 604 deposits the same from a clearinghouse bank, such as a clearing bank, which the issuer (i) 604 typically chooses, into the settlement house. Thus, a typical transaction involves various entities to request, authorize, and fulfill processing the transaction.

The transaction processing system 600 will preferably have network components suitable for scaling the number and data payload size of transactions that can be authorized, cleared and settled in both real time and batch processing. These include hardware, software, data elements, and storage network devices for the same. Examples of transaction processing system 600 include those operated, at least in part, by: American Express Travel Related Services Company, Inc; MasterCard International, Inc.; Discover Financial Services, Inc.; First Data Corporation; Diners Club International, LTD; Visa Inc.; and agents of the foregoing.

Each of the network/switch (ns) 602 can include one or more data centers for processing transactions, where each transaction can include up to 100 kilobytes of data or more. The data corresponding to the transaction can include information about the types and quantities of goods and services in the transaction, information about the account holder (a) 608, the account user (au) 608, the merchant (m) 610, tax and incentive treatment(s) of the goods and services, coupons, rebates, rewards, loyalty, discounts, returns, exchanges, cashback transactions, etc.

By way of example, network/switch (ns) 602 can include one or more mainframe computers (e.g., one or more IBM mainframe computers) for one or more server farms (e.g., one or more Sun UNIX Super servers), where the mainframe computers and server farms can be in diverse geographic locations.

Each issuer (i) 604 (or agent issuer (ai) 604 thereof) and each acquirer (a) 606 (or agent acquirer (aq) 606 thereof) can use or more router/switch (e.g., Cisco™ routers/switches) to communicate with each network/switch (ns) 602 via dedicated communication systems.

Transaction handler (th) 602 can store information about transactions processed through transaction processing system 600 in data warehouses such as may be incorporated as part of the plurality of networks/switches 602. This information can be data mined. The data mining transaction research and modeling can be used for advertising, account holder and merchant loyalty incentives and rewards, fraud detection and prediction, and to develop tools to demonstrate savings and efficiencies made possible by use of the transaction processing system 600 over paying and being paid by cash, or other traditional payment mechanisms.

Access points 630, 632 are typically made up of small computer systems located at a processing center that interfaces between the center's host computer and the interchange center The access point facilitates the transmission of messages and files between the host and the interchange center supporting the authorization, clearing and settlement of transaction. Telecommunication links between the acquirer (q) and its access point, and between the access point and issuer (i) 104 are typically local links within a center and use a proprietary message format as preferred by the center.

The VisaNet® system is an example component of the transaction handler (th) 602 in the transaction processing system 600. Presently, the VisaNet® system is operated in part by Visa Inc. As of 2006, the VisaNet® system Inc. was processing around 300 million transaction daily, on over 1 billion accounts used in over 170 countries. Financial instructions numbering over 16,000 connected through the VisaNet® system to around 30 million merchants (m) 610. In 2007, around 71 billion transactions for about 4 trillion U.S. dollars were cleared and settled through the VisaNet® system, some of which involved a communication length of around 24,000 miles in around two (2) seconds.

A data processing center (such as is located within an acquirer, issuer, or other entity) houses processing systems that support merchant and business locations and maintains customer data and billing systems. Preferably, each processing center is linked to one or two interchange centers. Processors are connected to the closest interchange, and if the network experiences interruptions, the network automatically routes transactions to a secondary interchange center. Each interchange center is also linked to all of the other interchange centers. This linking enables processing centers to communicate with each other through one or more interchange centers. Also, processing centers can access the networks of other programs through the interchange center. Further, the network ensures that all links have multiple backups. The connection from one point of the network to another is not usually a fixed link; instead, the interchange center chooses the best possible path at the time of any given transmission. Rerouting around any faulty link occurs automatically.

Figure 7:
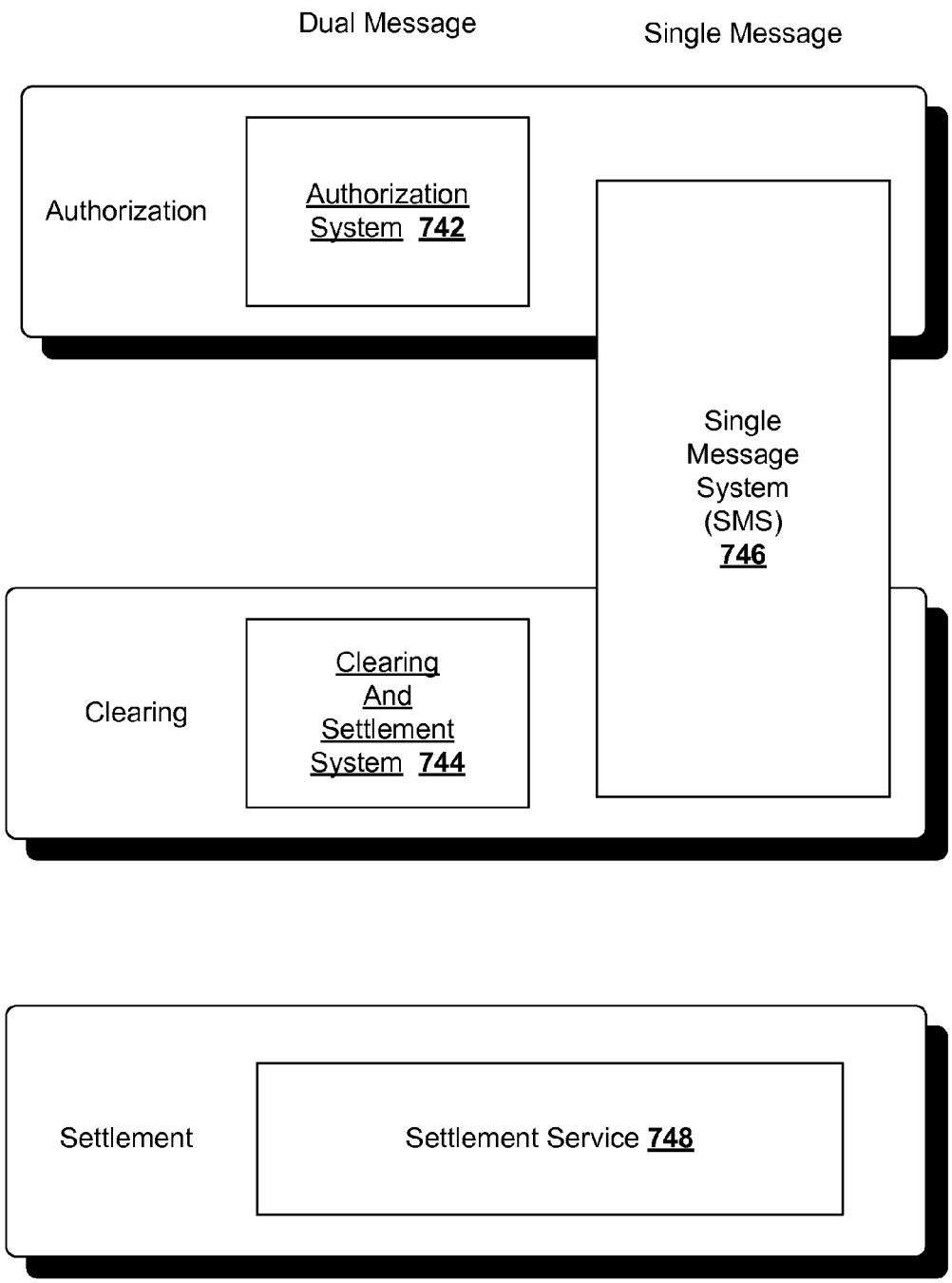
FIG. 7 illustrates systems housed within an interchange center to provide online and offline transaction processing of transactions in a payment processing system of FIG. 6.

FIG. 7 illustrates systems 740 housed within an interchange center to provide on-line and off-line transaction processing. For dual message transaction, authorization system 742 provides authorization. System 742 supports on-line and off-line functions, and its file includes internal systems tables, a customer database and a merchant central file. The on-line functions of system 742 support dual message authorization processing. This processing involves routing, cardholder and card verification and stand-in processing, and other functions such as file maintenance. Off-line functions including reporting, billing, and generating recovery bulletins. Reporting includes authorization reports, exception file and advice file reports, POS reports and billing reports. A bridge from system 742 to system 746 makes it possible for members using system 742 to communicate with members using system 746 and access the SMS gateways to outside networks.

Clearing and settlement system 744 clears and settles previously authorized dual message transactions. Operating six days a week on a global basis, system 744 collects financial and non-financial information and distributes reports between members It also calculates fees, charges and settlement totals and produces reports to help with reconciliation. A bridge forms an interchange between system 744 processing centers and system 846 processing centers.

Single message system 746 processes full financial transactions. System 746 can also process dual message authorization and clearing transactions, and communicates with system 742 using a bridge and accesses outside networks as required. System 746 processes Visa, Plus Interlink and other card transactions. The SMS files comprise internal system tables that control system access and processing, and the cardholder database, which contains files of cardholder data used for PIN verification and stand-in processing authorization. System 746 on-line functions perform real-time cardholder transaction processing and exception processing for authorization as well as full financial transactions. System 746 also accumulates reconciliation and settlement totals. System 746 off-line functions process settlement and funds transfer requests and provide settlement and activities reporting. Settlement service 748 consolidates the settlement functions of system 744 and 746, including Interlink, into a single service for all products and services. Clearing continues to be performed separately by system 744 and system 746.

Figure 8:
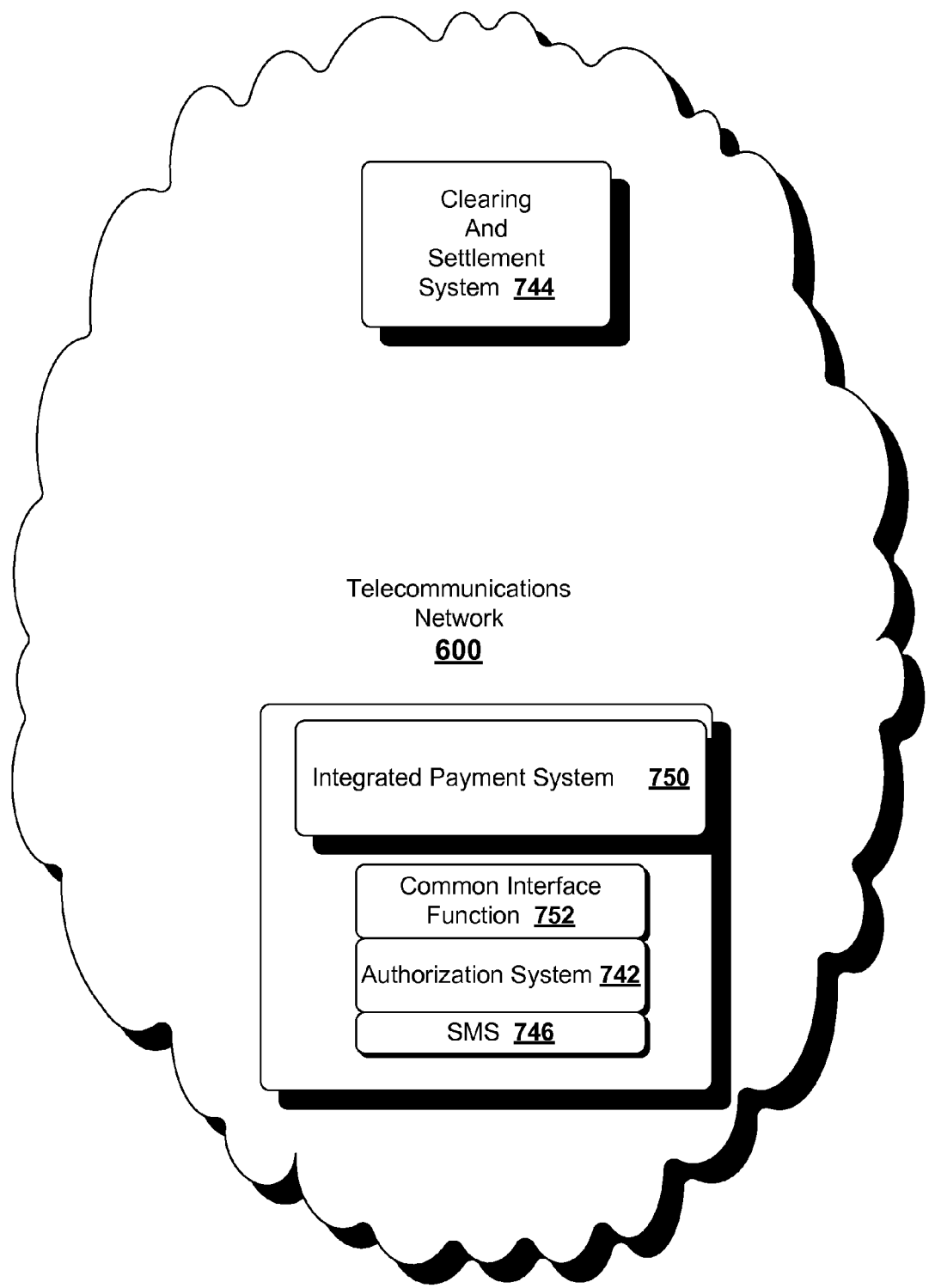
FIG. 8 illustrates another view of the components of FIG. 7.

FIG. 8 illustrates another view of components of FIG. 7 as a telecommunications network 600. Integrated payment system 750 is the primary system for processing all on-line authorization and financial request transactions. System 750 reports both dual message and single message processing. In both cases, settlement occurs separately. The three main software components are the common interface function 752, authorization system 742 and single message system 746.

Common interface function 752 determines the processing required for each message received at an interchange center. It chooses the appropriate routing, based on the source of the message (system 742, 744 or 746), the type of processing request and the processing network. This component performs initial message editing, and, when necessary, parses the message and ensures that the content complies with basic message construction rules. Common interface function 752 routes messages to their system 742 or system 746 destinations.

The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes. Based on the disclosure and teachings provided herein, a person of ordinary skill in the art will appreciate other ways and/or methods for various implements. Moreover, it is understood that a functional step of described methods or processes, and combinations thereof can be implemented by computer program instructions that, when executed by a processor, create means for implementing the functional steps. The instructions may be included in computer readable medium that can be loaded onto a general purpose computer, a special purpose computer, or other programmable apparatus.

It should be understood implementations can be in the form of control logic, in a modular or integrated manner, using software, hardware or a combination of both. The steps of a method, process, or algorithm described in connection with the implementations disclosed herein may be embodied directly in hardware, in a software module executed by a processor, or in a combination of the two.

The various steps or acts in a method or process may be performed by hardware executing software, and in the order shown, or may be performed in another order. Additionally, one or more process or method steps may be omitted or one or more process or method steps may be added to the methods and processes. An additional step, block, or action may be added in the beginning, end, or intervening existing elements of the methods and processes. Based on the disclosure and teachings provided herein, a person of ordinary skill in the art will appreciate other ways and/or methods for various implements.

It is understood that the examples and implementations described herein are for illustrative purposes only and that various modifications or changes in light thereof will be suggested to persons skilled in the art and are to be included within the spirit and purview of this application and scope of the appended claims.

What is claimed is:

1. A method comprising:
  receiving, via a computing device, information relating to a transaction comprising a sale of a product by a merchant to an account holder conducted on a consumer account issued to the account holder by an issuer, wherein the product is a predetermined combination of a plurality of different items;
  requesting, via the computing device, from the issuer, payment for the transaction to the merchant;
  confirming, via the computing device, that the transaction occurs within a predetermined time period and that there is a rebate associated with the product and a corresponding sponsor financially responsible for the rebate, wherein the sponsor comprises a plurality of entities each having a corresponding account number, wherein each of the plurality of entities is associated with a respective one of the plurality of different items; and
  transmitting, via the computing device, to a transaction handler, instructions to debit the rebate from a sponsor account of the sponsor, wherein the debiting of the rebate to the account of the sponsor comprises debiting a predetermined portion of the rebate respectively to each of the account numbers of the plurality of entities.

2. The method of claim 1, wherein the method further comprises informing the merchant to discount the sale of the product to the account holder by the amount of the rebate.

3. The method of claim 2, wherein the method further comprises calculating the amount to be debited to the account of the account holder for the sale of the product in the transaction, wherein the amount reflects the application of the rebate to the purchase price of the product.

4. The method of claim 1, wherein the method further comprises instructing the issuer to credit the rebate to the consumer account.

5. The method of claim 1, wherein the method further comprises calculating the amount to be debited to the account of the sponsor.

6. The method of claim 1, wherein the account is any of a plurality of account numbers each of which have been issued by the issuer to the account holder.

7. The method of claim 1 wherein the product comprises the predetermined combination of the plurality of different items and a predetermined quantity of each item of the plurality of different items.

8. The method of claim 1 wherein the product comprises the predetermined combination of the plurality of different items, such that at least some of the plurality of different items were sold to the account holder in a plurality of prior transactions conducted on the account with a plurality of different merchants.

9. The method of claim 1 additionally comprising:
  transmitting, via the computing device, a notification to the account holder that the account holder has won the rebate.

10. A non-transitory computer readable storage medium comprising instructions which, when executed by a computer processor, performs a method comprising:
  receiving, via a computing device, information relating to a transaction comprising a sale of a product by a merchant to an account holder conducted on a consumer account issued to the account holder by an issuer, wherein the product is a predetermined combination of a plurality of different items;

requesting, via the computing device, from the issuer, payment for the transaction to the merchant;

confirming, via the computing device, that the transaction occurs within a predetermined time period and that there is a rebate associated with the product and a corresponding sponsor financially responsible for the rebate, wherein the sponsor comprises a plurality of entities each having a corresponding account number, wherein each of the plurality of entities is associated with a respective one of the plurality of different items; and transmitting, via the computing processor, to a transaction handler, instructions to debit the rebate from a sponsor account of the sponsor, wherein the debiting of the rebate to the account of the sponsor comprises debiting a predetermined portion of the rebate respectively to each of the account numbers of the plurality of entities.

11. A method comprising:

transmitting, via a computing device, a request, for delivery to an acquirer, for authorization of a transaction on an account issued to an account holder by an issuer for the purchase of a product from a merchant, wherein the product is a predetermined combination of a plurality of different items;

receiving, via the computing device, information sent from the acquirer, wherein the information includes an answer to the request for authorization as to whether:
   the account issued to the account holder is registered to receive a rebate;
   the product is eligible for the rebate;
   the transaction occurs within a predetermined time period;
   a sponsor is financially responsible for the rebate, wherein the sponsor comprises a plurality of entities each having a corresponding account number, wherein each of the plurality of entities is associated with a respective one of the plurality of different items transmitting, via the computing device, information, for delivery to the acquirer, as to an amount substantially to be:
   debited to the account of the account holder for the transaction;
   debited to a sponsor account of the sponsor for the rebate, wherein the debit of the rebate to the account of the sponsor comprises debiting a predetermined portion of the rebate respectively to each of the account numbers of the plurality of entities; and
   credited to an account issued by the acquirer, wherein when the account is registered to receive the rebate and the product is eligible for the rebate; and receiving, via the computing device, notice as to the crediting of an amount substantially equal to the rebate to the account issued by the acquirer.

12. The method of claim 11, further comprising calculating the amount to be debited to the account of the account holder for the sale of the product in the transaction, wherein the amount reflects the application of the rebate to the purchase price of the product.

13. The method of claim 11, wherein the request is received from the account holder at a Point of Service terminal (POS).

14. The method of claim 11, wherein the request is received from the account holder via an online e-commerce web service.

15. The method of claim 11 wherein the product comprises the predetermined combination of the plurality of different items and a predetermined quantity of each item of the plurality of different items.

16. The method of claim 11 wherein the product comprises the predetermined combination of the plurality of different items, such that at least some of the plurality of different items were sold to the account holder in a plurality of prior transactions conducted on the account with a plurality of different merchants.

17. A non-transitory computer readable storage medium comprising instructions which, when executed by a computer processor, performs a method comprising:

transmitting a request, for delivery to an acquirer, for authorization of a transaction on an account issued to an account holder by an issuer for the purchase of a product from a merchant wherein the product is a predetermined combination of a plurality of different items;

receiving, via the computing device, information sent from the acquirer, wherein the information includes an answer to the request for authorization as to whether:
   the account issued to the account holder is registered to receive a rebate;
   the product is eligible for the rebate;
   the transaction occurs within a predetermined time period;
   a sponsor is financially responsible for the rebate, wherein the sponsor comprises a plurality of entities each having a corresponding account number, wherein each of the plurality of entities is associated with a respective one of the plurality of different items transmitting, via the computing device, information, for delivery to the acquirer, as to an amount substantially to be:
   debited to the account of the account holder for the transaction;
   debited to a sponsor account of the sponsor for the rebate, wherein the debit of the rebate to the account of the sponsor comprises debiting a predetermined portion of the rebate respectively to each of the account numbers of the plurality of entities; and
   credited to an account issued by the acquirer, wherein when the account is registered to receive the rebate and the product is eligible for the rebate; and receiving, via the computing device, notice as to the crediting of an amount substantially equal to the rebate to the account issued by the acquirer.

18. A method comprising:

receiving, via a computing device, information requesting authorization of a transaction for a sale of a product by a merchant to an account holder conducted on a consumer account issued to the account holder by an issuer, wherein the product is a predetermined combination of a plurality of different items; and when the requested authorization is authorized and the transaction occurs within a predetermined time period for which there is a rebate associated with the product and a corresponding sponsor financially responsible for the rebate:
   debiting, via the computing device, the rebate to a sponsor account of the sponsor, wherein the sponsor comprises a plurality of entities each having a corresponding account number, with each of the plurality of entities associated with a respective one of the plurality of different items, wherein the debit of the rebate to the account of the sponsor further comprises debiting a predetermined portion of the rebate respectively to each of the account numbers of the plurality of entities;
   crediting, via the computing device, the rebate to a merchant account issued to the merchant; and when information is received that the product was returned by the account holder:
  crediting, via the computing device, the rebate to the sponsor account of the sponsor; and
  debiting, via the computing device, the rebate to the merchant account issued to the merchant.

19. The method of claim 18, wherein the method further comprises calculating the amount to be debited to the sponsor account of the sponsor.

20. The method of claim 18, wherein the consumer account is any of a plurality of account numbers each of which have been issued by the issuer to the account holder.

21. The method of claim 18, wherein:
the sponsor comprises a plurality entities each having a corresponding account number, wherein each of the plurality of entities is associated with a respective one of the plurality of different items; and
the debiting of the rebate to the sponsor account of the sponsor comprises debiting a predetermined portion of the rebate respectively to each of the account numbers of the plurality entities.

22. The method of claim 18, wherein the method further comprises:
forming a communication to send a request to confirm that there is a rebate associated with the product and a corresponding sponsor financially responsible for the rebate; and
receiving a communication containing the requested confirmation.

23. The method of claim 18 wherein the product comprises the predetermined combination of the plurality of different items and a predetermined quantity of each item of the plurality of different items.

24. The method of claim 18 wherein the product comprises the predetermined combination of the plurality of different items, such that at least some of the plurality of different items were sold to the account holder in a plurality of prior transactions conducted on the account with a plurality of different merchants.

25. A non-transitory computer readable storage medium comprising instructions which, when executed by a computing apparatus, performs a method comprising:
receiving information requesting authorization of a transaction for a sale of a product by a merchant to an account holder in a transaction conducted on a consumer account issued to the account holder by an issuer, wherein the product is a predetermined combination of a plurality of different items; and
when the requested authorization is authorized and the transaction occurs within a predetermined time period for which there is a rebate associated with the product and a corresponding sponsor financially responsible for the rebate:
  debiting the rebate to a sponsor account of the sponsor, wherein the sponsor comprises a plurality of entities each having a corresponding account number, with each of the plurality of entities associated with a respective one of the plurality of different items, wherein the debit of the rebate to the account of the sponsor further comprises debiting a predetermined portion of the rebate respectively to each of the account numbers of the plurality of entities;
  crediting the rebate to a merchant account issued to the merchant; and
  when information is received that the product was returned by the account holder:
    crediting the rebate to the sponsor account of the sponsor; and
    debiting the rebate to the merchant account issued to the merchant.

* * * * *